US 8,363,963 B2
(12) United States Patent  (10) Patent No.: US 8,363,963 B2
Yoshida  (45) Date of Patent: Jan. 29, 2013

(54) APPARATUS, METHOD AND COMPUTER READABLE MEDIUM THAT ASSOCIATES A PLURALITY OF POSSIBLE WORD RECOGNITION RESULTS WITH AN IMAGE

(75) Inventor: Akihito Yoshida, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 479 days.

(21) Appl. No.: 12/639,574

(22) Filed: Dec. 16, 2009

(65) Prior Publication Data

US 2010/0149569 A1  Jun. 17, 2010

(30) Foreign Application Priority Data

Dec. 17, 2008  (JP) ................................ 2008-321210

(51) Int. Cl.
*G06K 9/72* (2006.01)
*G06F 15/00* (2006.01)
(52) U.S. Cl. ........................................ 382/229; 358/1.1
(58) Field of Classification Search ................. 358/1.11; 382/182, 229
See application file for complete search history.

(56) References Cited

U.S. PATENT DOCUMENTS

| 5,563,403 | A |   | 10/1996 | Bessho et al. |
| 5,905,811 | A | * | 5/1999 | Shiiyama et al. ............. 382/229 |
| 7,130,487 | B1 |  | 10/2006 | Imagawa et al. |
| 2007/0022233 | A1 | * | 1/2007 | Bridges et al. ................. 710/62 |

FOREIGN PATENT DOCUMENTS

| JP | 5-20489 A | 1/1993 |
| JP | 5-54177 A | 1/1993 |
| JP | 7-182462 A | 7/1995 |
| JP | 7-182463 A | 7/1995 |
| JP | 7-192086 A | 7/1995 |
| JP | 7-192088 A | 7/1995 |
| JP | 2004-280514 A | 10/2004 |
| JP | 2006-72524 | 3/2006 |
| WO | WO00/36530 | 6/2000 |

* cited by examiner

*Primary Examiner* — Benny Q Tieu
*Assistant Examiner* — Eric A Rust
(74) *Attorney, Agent, or Firm* — Birch, Stewart, Kolasch & Birch, LLP

(57) ABSTRACT

An image processing apparatus includes: a character recognition section for performing a character recognition process and a formatting process section for generating an image file in which text data obtained by the character recognition process are associated with the image data, the character recognition section generating the text data corresponding respectively to a plurality of possible character recognition results. This makes it possible to prevent omission in search in a case where a keyword search based on the text data is carried out, in the image processing apparatus that generates an image file in which image data obtained by reading a document is associated with text data obtained by a character recognition process on the image data.

7 Claims, 14 Drawing Sheets

% EXAMPLE OF OVERLAPPING DESCRIPTIONS FOR VERTICAL WRITING AND HORIZONTAL WRITING
121.714282 Tz
1.00 0.00 0.00 1.00 60.48 206.64 Tm
/F5 7.0 Tf
<89e696ca> Tj                           % 画面(HORIZONTAL WRITING)
102.857137 Tz
1.00 0.00 0.00 1.00 60.24 196.56 Tm
/F5 7.0 Tf
<919c82c9> Tj                           % 像に(HORIZONTAL WRITING)
% FOR VERTICAL WRITING
86.567163 Tz
1.00 0.00 0.00 1.00 63.84 212.64 Tm
/F8 8.0 Tf
<89e6919c> Tj                           % 画像(VERTICAL WRITING)
77.272731 Tz
1.00 0.00 0.00 1.00 74.28 212.88 Tm
/F8 7.9 Tf
<96ca82c9> Tj                           % 面に(VERTICAL WRITING)

% EXAMPLE 1 OF OVERLAPPING DESCRIPTIONS OF KATAKANA AND CHINESE CHARACTER
102.857137 Tz
1.00 0.00 0.00 1.00 60.96 137.88 Tm
/F5 7.0 Tf
<8a4a838d9594> Tj                       % 開口部("口(RO)" IN KATAKANA)
102.857137 Tz
1.00 0.00 0.00 1.00 60.96 143.88 Tm
/F5 7.0 Tf
<8a4a8cfb9594> Tj                       % 開口部

% EXAMPLE 2 OF OVERLAPPING DESCRIPTIONS OF KATAKANA AND CHINESE CHARACTER
123.000002 Tz
1.00 0.00 0.00 1.00 59.28 61.56 Tm
/F5 6.0 Tf
<8356838388ea8376> Tj                   % シャープ("一(ICHI(ONE))" IN CHINESE NUMERAL)
123.000002 Tz
1.00 0.00 0.00 1.00 59.28 67.56 Tm
/F5 6.0 Tf
<83568383815b8376> Tj                   % シャープ
ET
```

APPARATUS, METHOD AND COMPUTER READABLE MEDIUM THAT ASSOCIATES A PLURALITY OF POSSIBLE WORD RECOGNITION RESULTS WITH AN IMAGE

This Nonprovisional application claims priority under 35 U.S.C. §119(a) on Patent Application No. 2008-321210 filed in Japan on Dec. 17, 2008, the entire contents of which are hereby incorporated by reference.

TECHNICAL FIELD

The present invention relates to an image processing apparatus, an image reading apparatus, an image transmitting device, an image forming apparatus, and an image processing method each of which is for generating an image file in which an image data obtained by reading a document is associated with a text data obtained by a character recognition process on this image data.

BACKGROUND ART

Conventionally, there has been a technique including the steps of: obtaining image data by reading information on a paper-medium document with use of a scanner; generating text data of characters in the image data by performing a character recognition process on the image data; and generating an image file in which the image data and the text data are associated with each other.

For example, Patent Document 1 discloses a technique including the steps of: obtaining PDF image data by reading information on a paper medium with use of a scanner; generating text data by performing a character recognition process on the PDF image data; detecting a margin area of the PDF image data and a color of the margin area; and embedding, in the margin area of the PDF image data, the text data of a color that is the same as the color of the margin area. According to this technique, it is possible to perform a search process or the like with use of the text data while an image quality is not deteriorated. That is, because the text data of the same color as the color of the margin area is embedded in the margin area, the text data is not visible to a user. Accordingly, the image quality does not deteriorate. Further, based on the text data which is embedded in the margin area, information on a document can be extracted by performing, for example, a keyword search.

Patent Literature 1
Japanese Patent Application Publication, Tokukai, No. 2004-280514 A (Publication Date: Oct. 7, 2004)
Patent Literature 2
Japanese Patent Application Publication, Tokukaihei, No. 7-192086 A (Publication Date: Jul. 28, 1995)

SUMMARY OF INVENTION

However, a technique of Patent Literature 1 employs a text data in which one character is associated with only one character recognition result. Accordingly, for example, in a case where it is not clear whether a text direction is in a vertical direction or a horizontal direction, that is, whether texts are in vertical writing or horizontal writing in image data, or in a case where there are a plurality of possible character recognition results, omission in a search process may occur when the search process is performed by using the text data.

The present invention is attained in view of the above problems. An object of the present invention is to prevent omission in search in a case where a keyword search is performed based on text data, in an image processing apparatus that generates an image file in which image data obtained by reading a document is associated with the text data obtained by a character recognition process on this image data.

In order to solve the above problems, an image processing apparatus of the present invention includes: a character recognition section for performing a character recognition process for a character included in a document, based on image data obtained by reading the document; and an image file generation section for generating an image file in which text data obtained by the character recognition process are associated with the image data, the character recognition section generating the text data corresponding respectively to a plurality of possible character recognition results, in a case where the character recognition section detects the plurality of possible character recognition results, the image file generation section generating the image file in which each of the text data produced by the character recognition section is associated with the image data.

Further, in order to solve the above problems, an image processing method of the present invention includes the steps of: performing a character recognition process for a character included in a document, based on image data obtained by reading the document; and generating an image file in which text data obtained by the character recognition process are associated with the image data, wherein: in the step of performing the character recognition process, the text data corresponding respectively to a plurality of possible character recognition results are generated in a case where the character recognition section detects the plurality of possible character recognition results; and in the step of generating the image file, the image file in which each of the text data produced in the step of performing the character recognition process is associated with the image data is generated.

According to the image processing apparatus and the image processing method, in a case where the plurality of possible character recognition results are detected, each of the text data corresponding to each of the plurality of possible character recognition results is produced. Then, the image file is generated so that each of the text data is associated with the image data. This makes it possible to include each possible character recognition result in objects for search even in a case where the plurality of possible character recognition results are present. This makes it possible to prevent omission in search.

Advantageous Effects of Invention

As described above, according to the image processing apparatus and the image processing method of the present invention, in a case where the plurality of possible character recognition results are detected, each of the text data corresponding to each of the plurality of possible character recognition results is produced.

Therefore, the image file is generated so that each of the text data is associated with the image data. This makes it possible to include each possible character recognition result in objects for search even in a case where the plurality of possible character recognition results are present. This makes it possible to prevent omission in search.

BRIEF DESCRIPTION OF DRAWINGS

FIG. 11 is an explanatory view illustrating an example of a command for embedding transparent text data in image data, in the image processing apparatus shown in FIG. 2.

REFERENCE SIGNS LIST

1 Digital Color Multifunction Printer (Image Processing Apparatus, Image Reading Apparatus, Image Transmitting Device)
2 Image Input Apparatus
3, 3b Image Processing Apparatus
4 Image Output Apparatus
5 Communication Device
6 Operation Panel
14 Document Detection Section
15 Document Correction Section
21 Segmentation Process Section
22 Image File Generation Section
23 Storage Section
24 Control Section
31 Signal Conversion Section
32 Binarization Process Section
33 Resolution Conversion Section
34 Document Skew Detection Section
35 Layout Analysis Section
41 Character Recognition Section
42 Draw Command Generation Section
43 Formatting Process Section
100 Image Reading Apparatus (Image Processing Apparatus, Image Reading Apparatus)

DESCRIPTION OF EMBODIMENTS

One embodiment of the present invention is described below. Note that the present embodiment explains mainly one example of a case where the present invention is applied to a digital color multifunction printer.

Whole Configuration of Digital Color Multifunction Printer

Figure 2:
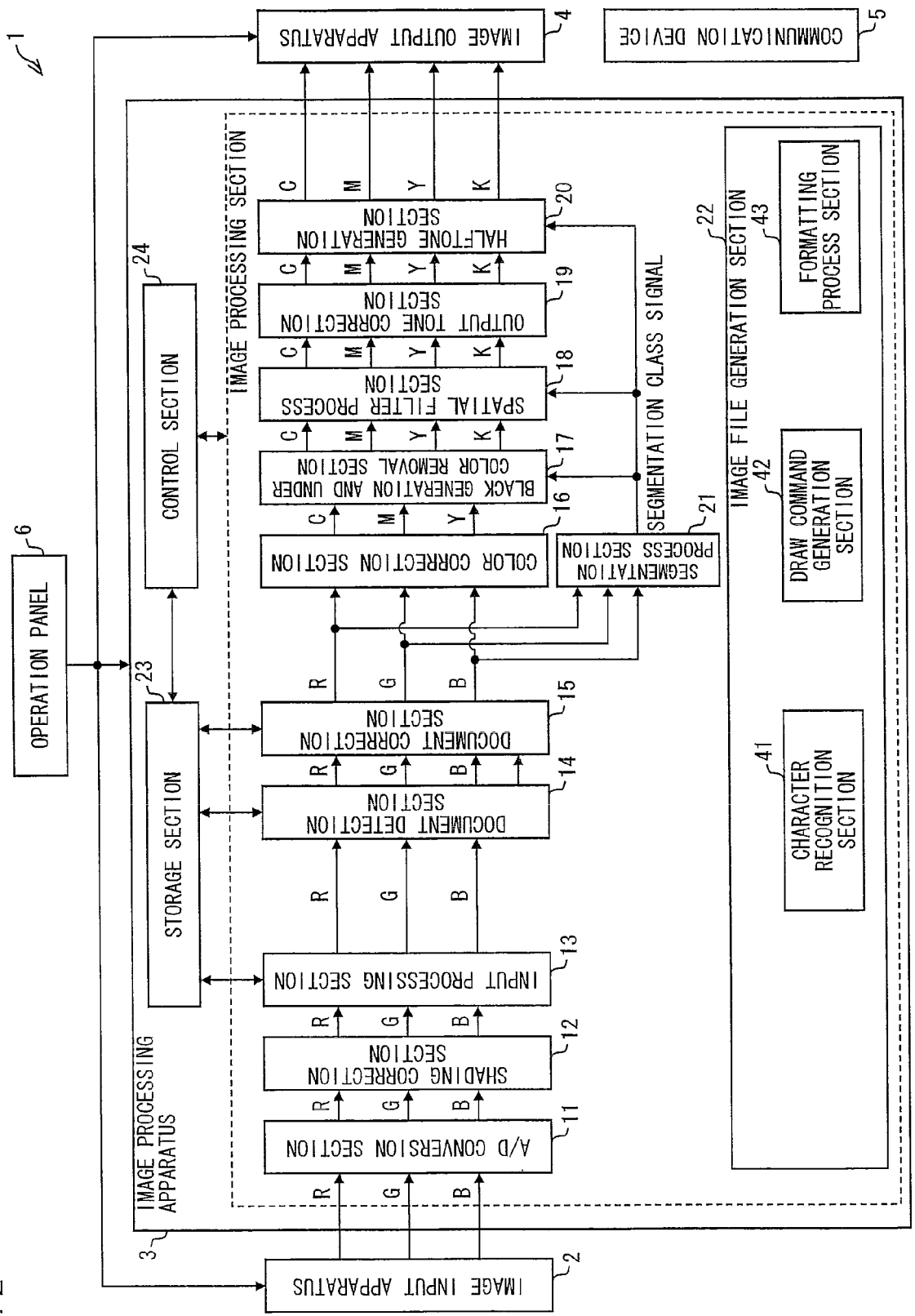
FIG. 2 is a block diagram schematically illustrating a configuration of an image processing apparatus according to one embodiment of the present invention and a data flow in an image forming mode.
Figure 3:
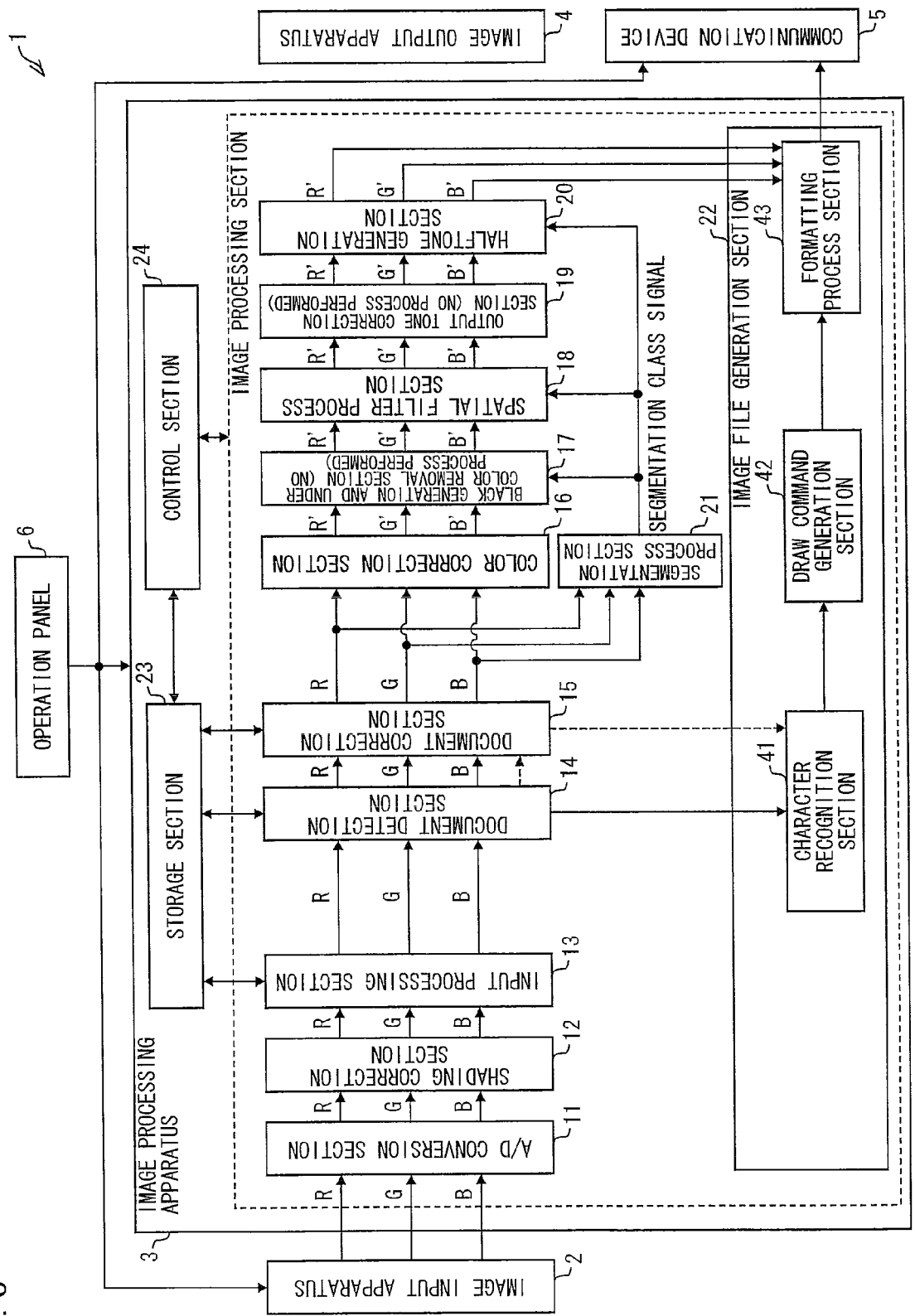
FIG. 3 is a block diagram illustrating a data flow in an image transmission mode in the image processing apparatus shown in FIG. 2.

FIGS. 2 and 3 are block diagrams each schematically illustrating a digital color multifunction printer 1 of the present embodiment. Note that the digital color multifunction printer 1 has (1) an image forming mode in which an image corresponding to image data read by an image input apparatus 2 is formed on a recording material with use of an image output apparatus 4, and (2) an image transmission mode for transmitting, with the use of a communication device 5 to an external device, an image file including processed image data obtained by subjecting the image data read by the image input apparatus 2 to an process such as document skew correction or the like and text data obtained by subjecting the processed image data to a character recognition process. FIG. 2 shows a data flow in the image forming mode and FIG. 3 shows a data flow in the image transmission mode.

As shown in FIGS. 2 and 3, the digital color multifunction printer 1 includes the image input apparatus 2, an image processing apparatus 3, an image output apparatus 4, a communication device, 5, and an operation panel 6.

The image input apparatus 2 generates image data by reading an image of a document. The image input apparatus 2 includes a scanner section (not shown) including a device, such as a CCD (Charge Coupled Device), for converting optical information into an electric signal. In the present embodiment, the image input apparatus 2 converts an optical image reflected from the document to RGB (R: Red, G: Green, and B: Blue) analog signals, and outputs the RGB analog signals to the image processing apparatus 3.

Figure 4:
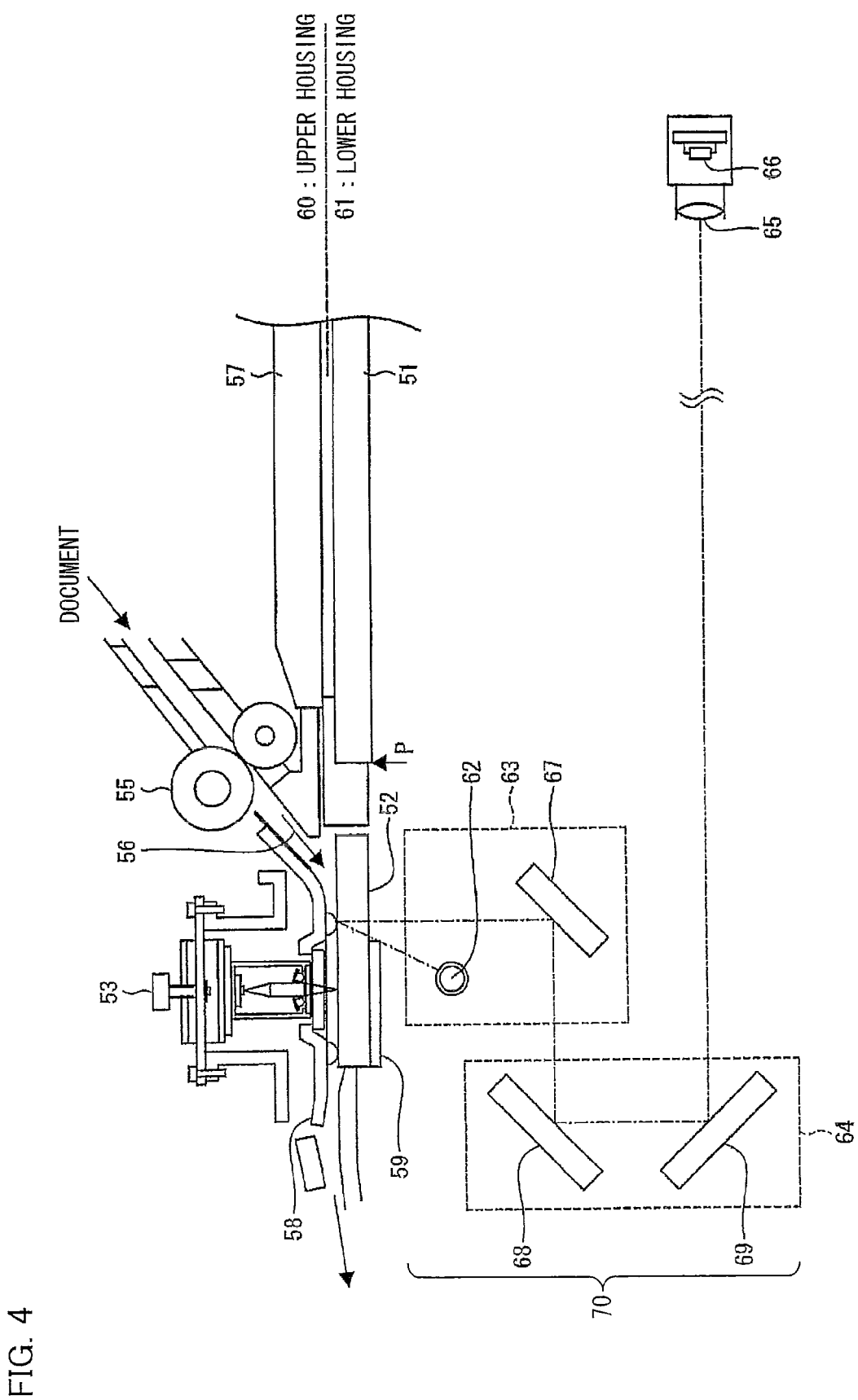
FIG. 4 is a cross sectional view illustrating an example of a configuration of an image input apparatus provided in the image processing apparatus shown in FIG. 2.

FIG. 4 is a cross sectional view illustrating one example of the image input apparatus 2. The image input apparatus 2 illustrated in FIG. 4 includes an upper housing 60 and a lower housing 61. The upper housing (document cover) 60 includes a document holder 57, a pair of alignment rollers 55, a document conveying path 56, an image sensor section 53, an upper document conveyance guide 58, and the like. The lower housing 61 includes a first contact glass (platen) 51, a second contact glass 52, a reading section 70, a light shielding member 59, and the like. The upper housing 60 is configured to be openable and closable with respect to the lower housing 61.

The image input apparatus 2 has (1) a static-sheet scanning mode in which an under surface of a document placed on the first contact glass 51 is read by the reading section 70, (2) a sheet-feed reading mode in which an under surface of a document being fed (moving) on the second contact glass 52 is read by the reading section 70, and (3) a double-side reading mode in which a top surface of a document being fed (moving) on the second contact glass 52 is read by the image sensor section 53 while an under surface of this document is read by the reading section 70.

The pair of alignment rollers 55 is for aligning an angle of a document in the sheet-feed reading mode and the double-side reading mode so that a front end of the document fed in becomes perpendicular to a conveyance direction. The front end of the document fed runs into a nip section of the pair of alignment rollers 55 that are not in operation and the document is bent to a predetermined degree. Then, the pair of alignment rollers 55 is rotated so as to align a direction of the document, so that the document is fed to a downstream side of the pair of alignment rollers 55.

The image sensor section 53 is for reading an image on a top surface of a document fed on the second contact glass 52 in a case where the double-side reading mode is selected.

The document holder 57 is for fixing a position of a document by steadying the document placed on the first contact glass 51 against the first contact glass 51, in a case where the static-sheet scanning mode is selected.

The reading section 70 includes a first reading unit 63, a second reading unit 64, an imaging lens 65, and a CCD (Charge Coupled Device) 66.

The first reading unit 63 includes a light source (exposure lamp) 62 for exposing a surface of a document which surface is to be read, a first reflection mirror 67 for reflecting, toward the second reading unit 64, light reflected from the document.

In the static-sheet scanning mode, while moving at a constant speed V rightward from a position P in FIG. 4 in parallel to the first contact glass 51 by a distance corresponding to a document size, the first reading unit 63 exposes the document placed on the first contact glass 51 by use of light emitted from the light source 62 and lead light reflected from the document to the second reading unit 64, by reflecting the reflected light with use of the first reflection mirror 67. The document size may be a result of detecting a size of a document placed on the first contact glass 51, with use of document size detection means (not shown) (e.g., document size detection means made of a photoelectric conversion element such as a phototransistor). Alternatively, the document size may be a document size inputted by a user from an operation panel. Note that in the present embodiment, the first contact glass 51 is configured to be a size that makes it possible to read a document of up to a size of A3 (420 mm×297 mm).

In the sheet-feed reading mode and the double-side reading mode, the first reading unit 63 stays at a predetermined position opposed to the second contact glass 52. At this position, the first reading unit 63 exposes the document fed on the second contact glass 52 by use of light emitted from the light source 62 and leads light reflected from the document to the second reading unit 64, by reflecting the reflected light with use of the first reflection mirror 67.

The second reading unit 64 includes a second reflection mirror 68 and a third reflection mirror 69. These reflection mirrors 68 and 69 are configured to lead, to the imaging lens 65 and the CCD 66, the light entered from the first reflection mirror 67. Note that in the static-sheet scanning mode, the second reading unit 64 moves at a speed of V/2, following the first reading unit 63.

The light shielding member 59 is for preventing the image sensor section 53 from becoming incapable of reading an image at an appropriate density, by preventing the light of the light source 62 in the reading section 70 from entering the image sensor section 53.

The imaging lens 65 forms an image on the CCD 66 from the light that is reflected from the document and that is entered from the third reflection mirror 69.

The CCD 66 converts the light entered through the imaging lens 65 into an analog electric signal. Note that this electric signal is converted to digital image data by the image processing apparatus 3 later described. Note that in the case of the double-side reading mode, image data on the under surface of the document read by the reading section 70 is inputted into the image processing apparatus 3 and processed; thereafter, image data on the top surface of the document read by the image sensor section 53 is inputted into the image processing apparatus 3 and processed. While the image data on the under surface of the document is processed by the image processing apparatus 3, the image data on the top surface of the document read by the image sensor section 53 is temporarily stored in a memory (not shown). When the processing on the image data on the under surface of the document ends, the image data on the top surface of the document is read out from the memory and sent to the image processing apparatus 3 for processing.

As shown in FIGS. 2 and 4, the image processing apparatus 3 includes an A/D (Analog/Digital) conversion section 11, a shading correction section 12, an input processing section 13, a document detection section 14, a document correction section 15, a color correction section 16, a black generation and under color removal section 17, a spatial filter process section 18, an output tone correction section 19, a halftone generation section 20, a segmentation process section 21, an image file generation section 22, a storage section 23, and a control section 24. The storage section 23 is storage means in which various data (e.g., image data) to be processed in the image processing apparatus 3 is stored. A configuration of the storage section 23 is not specifically limited. For example, a hard disk may be used as the storage section 23. The control section 24 is control means for controlling operations of each section provided in the image processing apparatus 3. This control section 24 may be provided in a main control section (not shown) of the digital color multifunction printer 1. Alternatively, the control section 24 may be provided separately from the main control section and configured to perform a process in cooperation with the main control section.

In the image forming mode, the image processing apparatus 3 outputs CMYK image data to the image output apparatus 4. This CMYK image data is obtained by performing various image processes on the image data entered from the image input apparatus 2. In the image transmission mode, the image processing apparatus 3 performs, on the image data entered from the image input apparatus 2, image processes such as a skew correction process, an image region extraction process, a scaling process, and a rotation process. Further, in the image transmission mode, the image processing apparatus 3 obtains text data by subjecting the image data to a character recognition process so as to generate an image file including the image data and the text data. Then, the image processing apparatus 3 outputs the image file to the communication device 5. Note that the image processing apparatus 3 is explained in detail later.

The image output apparatus 4 outputs, onto a recording material (e.g., paper), the image data inputted from the image processing apparatus 3. A configuration of the image output apparatus 4 is not specifically limited. It is possible to use, for example, an electrophotographic or ink-jet image output apparatus, as the image output apparatus 4.

The communication device 5 may be configured by, for example, a modem or a network card. The communication device 5 performs data communication with other devices (e.g., a personal computer, a server, a display device, other digital multifunction printer, and/or a facsimile machine), connected to a network, via a network card, a LAN cable, or the like. When transmitting image data, the communication device 5 performs a procedure for transmission to a destination and ensures a state transmittable to the destination. Then, the communication device 5 reads out, from a memory, the image data compressed in a predetermined format, subjects the image data to necessary processes such as a conversion in compression format, and then transmits the image data in sequence via a communication line. Further, when receiving image data, the communication device 5 performs a communication procedure and then receives image data transmitted from a source and inputs the image data into the image processing apparatus 3. The received image data is subjected to a predetermined process such as a decompression process, a rotation process, a resolution conversion process, output tone correction, and a tone reproduction process in the image processing apparatus 3, and then outputted by the image output apparatus 4. Note that the received image may be stored in a storage device (not shown), and the image processing apparatus 3 may read out the received image data from the storage device as appropriate and subjects the image data to the predetermined process.

The operation panel 6 is configured with a setup button, a display section such as a liquid crystal display, and the like (which are not shown). The operation panel 6 transmits, to the main control section (not shown) of the digital color multifunction printer 1, information inputted by a user from the setup button as well as displaying, on the display section, information corresponding to an instruction given by the main control section. The user is allowed to input, from the control panel 6, various information such as a process mode for inputted image data, the number of sheets to be printed, a sheet size, and a destination address.

The main control section is made of, for example, a CPU (Central Processing Unit) or the like, and controls, based on, for example, a program and various data which are stored in a ROM (not shown) or the like, information inputted from the operation panel 6 or the like, operations of the respective sections of the digital color multifunction printer 1.

Next, the following explains a process in each section provided in the image processing apparatus 3 in each of the modes above.

(2) Configuration and Operation of Image Processing Apparatus 3

(2-1) Image Forming Mode

The following explains in more detail a configuration of the image processing apparatus 3 and an operation of the image forming apparatus 3 in the image forming mode. In the image forming mode, as shown in FIG. 2, first, the A/D conversion section 11 converts the RGB analog signals inputted from the image input apparatus 2 into digital signals and outputs the digital signals to the shading correction section 12.

The shading correction section 12 receives the digital RGB signals from the A/D conversion section 11 and subjects the digital RGB signals to a process for removing various distortions produced in an illumination system, an image-focusing system and an image-sensing system of the image input apparatus 2. Then, the shading correction section 12 outputs the processed digital RGB signals to the input processing section 13.

The input processing section (input tone correction section) 13 adjusts a color balance of the RGB signals from which various distortions are removed in the shading correction section 12, and simultaneously converts the RGB signals to signals, such as density signals, easy to handle for the image processing apparatus 3. Further, the input processing section 13 also performs removal of background density and adjustment of image quality such as contrast. The input processing section 13 also stores the image data processed as described above into the storage section 23.

The document detection section 14 detects, based on image data, a skew angle of a document image, a top-to-bottom direction, an image region that is a region where an image is present in the image data, and the like. The document correction section 15 performs a skew correction process, a top-to-bottom direction correction process, an image extraction process, and the like process on the image data, based on the results of the detection by the document detection section 14.

Figure 5:
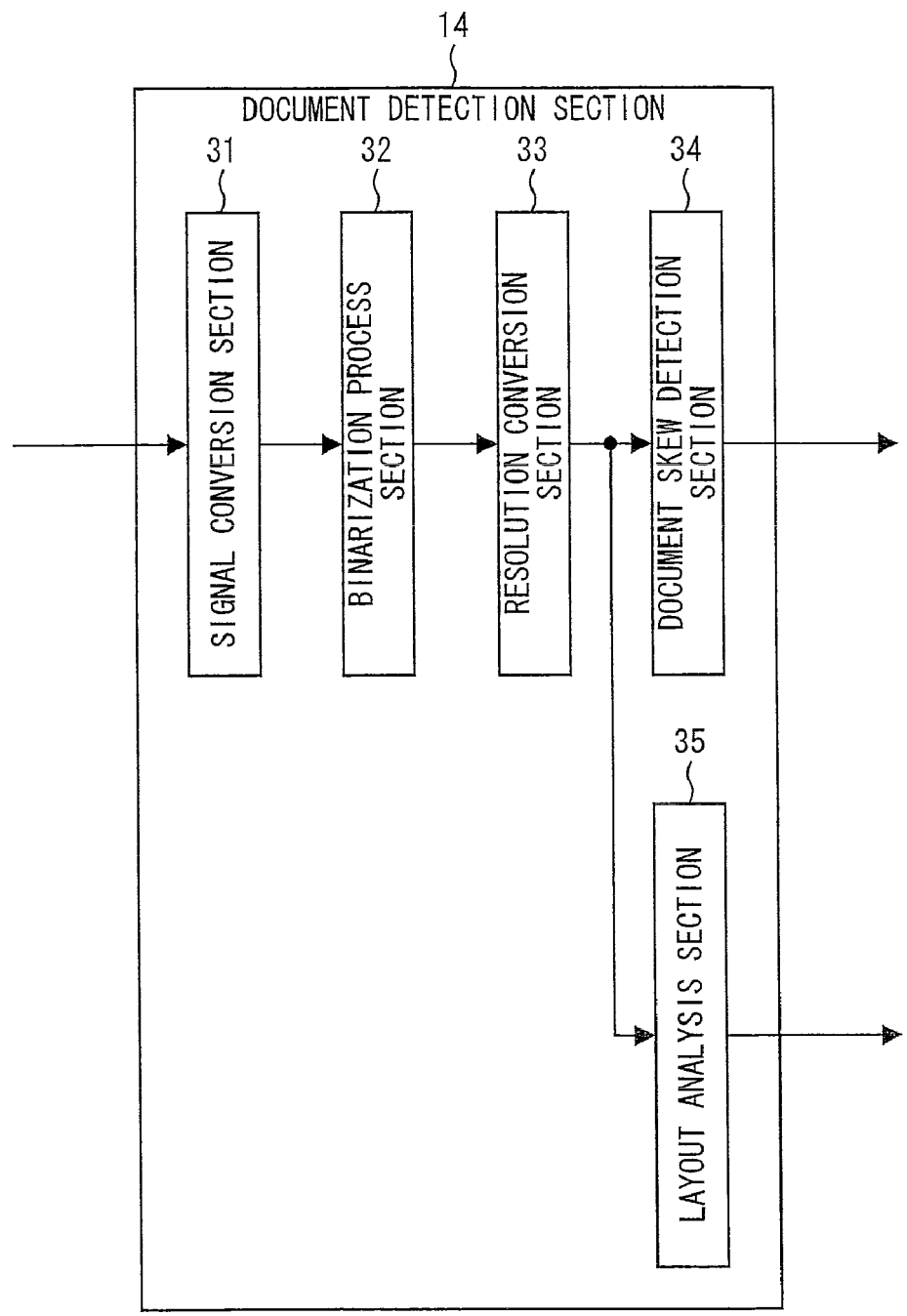
FIG. 5 is a block diagram schematically illustrating a configuration of a document detection section provided in the image processing apparatus shown in FIG. 2.

FIG. 5 is a block diagram schematically illustrating a configuration of the document detection section 14. As shown in FIG. 5, the document detection section 14 includes a signal conversion section 31, a binarization process section 32, a resolution conversion section 33, a document skew detection section 34, and a layout analysis section 35.

In a case where the image data having been subjected to the processes above by the input processing section 13 is color image data, the signal conversion section 31 converts the color image data into a brightness signal or a luminance signal (monochrome image data).

For example, the signal conversion section 31 converts the RGB signals to a luminance signal Y by calculating $Y_i = 0.30 R_i + 0.59 G_i + 0.11 B_i$, where: Y is a luminance signal of each pixel; R, G, and B are respective color components of the RGB signals of each pixel; and a subscript i is a value (i is an integer equal to or greater than 1) given to each pixel.

Alternatively, the RGB signals may be converted to a CIE1976L*a*b* signal (CIE: Commission International de l'Eclairage, L*: Brightness, a* and b*:chromaticity).

The binarization process section 32 binarizes the image data by comparing the monochrome image data (luminance value (luminance signal) or brightness value (brightness signal)) with a predetermined threshold. For example, in a case where the image data is an 8-bit image data, the threshold is set to 128. Alternatively, an average value of densities (pixel values) in a block made of a plurality of pixels (e.g., 5 pixels×5 pixels) may be set as the threshold.

The resolution conversion section 33 converts a resolution of the binarized image data to a low resolution. For example, image data read at 1200 dpi, 750 dpi or 600 dpi is converted to image data of 300 dpi. A conversion method of the resolution is not specifically limited. It is possible to use, for example, a conventionally known method such as a nearest neighbor method, a bilinear method, and a bicubic method. Further, the resolution conversion section 33 outputs the image data (the image data of 300 dpi in the present embodiment) having a reduced resolution, to the document skew detection section 34. Note that in the case of the image transmission mode, the resolution conversion section 33 not only outputs, to the document skew detection section 34 and the layout analysis section 35, image data whose resolution is reduced to a first resolution (300 dpi in the present embodiment) but also outputs, to the layout analysis section 35, image data whose resolution is reduced to a second resolution (75 dpi in the present embodiment) lower than the first resolution.

Figure 6:
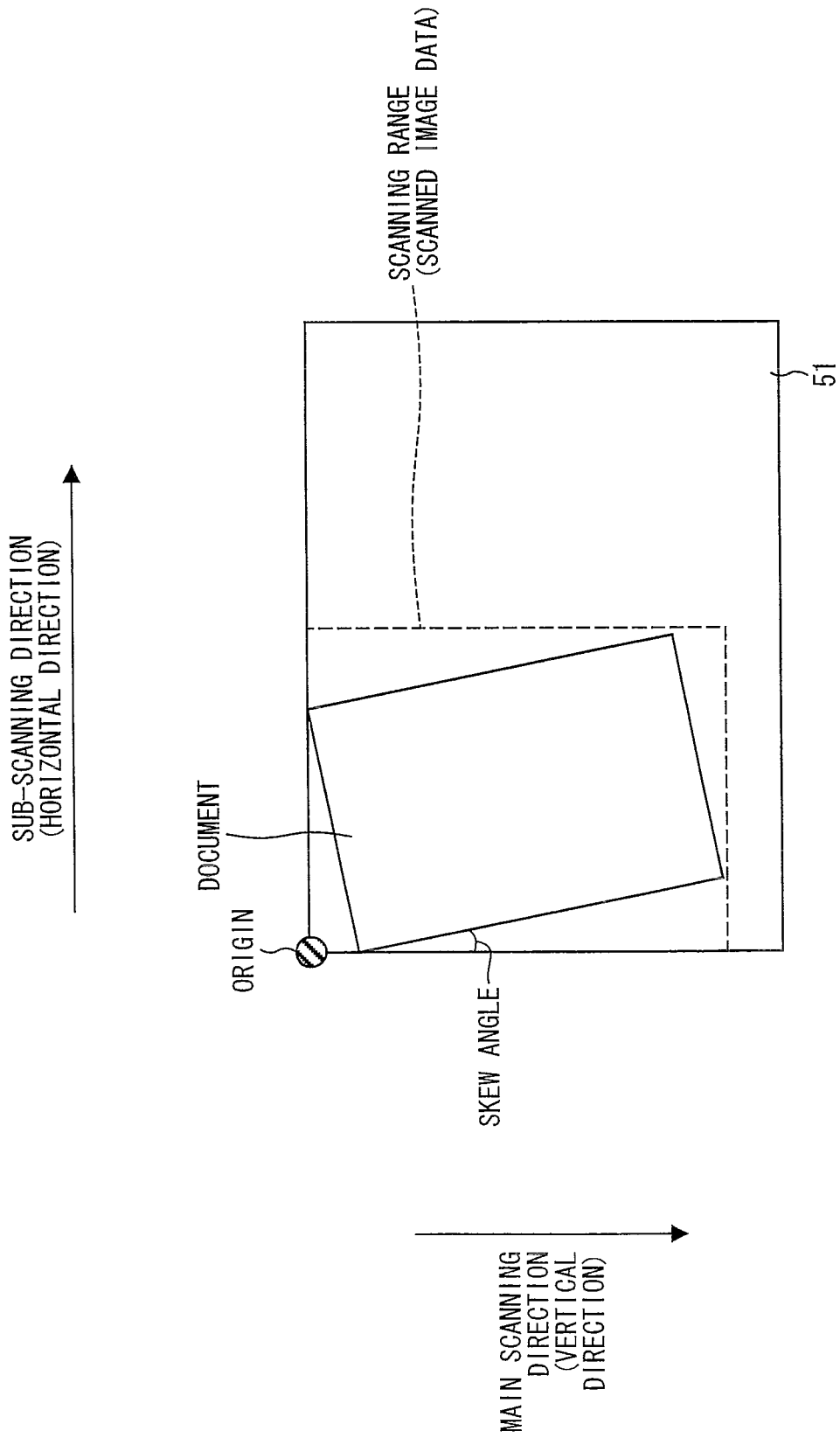
FIG. 6 is an explanatory diagram illustrating one example of a relation between a reading area and a document position at the time of reading in the image input apparatus shown in FIG. 4.

The document skew detection section 34 detects a skew angle of a document with respect to a reading range (regular document orientation) in image reading, based on the image data whose resolution is converted to a low resolution by the resolution conversion section 33, and outputs a result of the detection to the document correction section 15. That is, in a case where, as shown in FIG. 6, an orientation of the document in image reading is skewed with respect to a reading range (regular document orientation) in the image input apparatus 2, the document skew detection section 34 detects the skew angle.

A method of detecting the skew angle is not specifically limited. However, various conventionally known methods can be used. For example, a method described in Patent Literature 2 may be used. In this method, a plurality of boundary points between black pixels and white pixels (e.g., coordinates of black/white boundary points of an upper edge of each text) are extracted from the binarized image data, and coordinate data of a line of points for the boundary points is obtained. Then, based on the coordinate data of the line of points, a regression line is obtained and a regression coefficient b of the regression line is calculated according to the formula (1) below:

$$b = Sxy/Sx \quad (1)$$

Note that: Sx is an error sum of squares of a variable x and Sy is an error sum of squares of a variable y; and Sxy is a sum of products each obtained by multiplying a residual of x by a residual of y. In other words, Sx, Sy and Sxy are represented by the following formulae (2) to (4):

$$Sx = \sum_{i=1}^{n}(x_i - x)^2 = \sum_{i=1}^{n} x_i^2 - \left(\sum_{i=1}^{n} x_i\right)^2 \Big/ n \quad (2)$$

$$Sy = \sum_{i=1}^{n}(y_i - y)^2 = \sum_{i=1}^{n} y_i^2 - \left(\sum_{i=1}^{n} y_i\right)^2 \Big/ n \quad (3)$$

$$Sxy = \sum_{i=1}^{n}(x_i - x)(y_i - y) = \sum_{i=1}^{n} x_i y_i - \left(\sum_{i=1}^{n} x_i\right)\left(\sum_{i=1}^{n} y_i\right) \Big/ n \quad (4)$$

Further, by using the regression coefficient b calculated as described above, a skew angle θ is calculated according to the following formula (5):

$$\tan \theta = b \quad (5)$$

The layout analysis section 35 does not operate in the image forming mode. The operation of the layout analysis section 35 is explained later.

The document correction section 15 subjects the image data to the skew correction process, based on the skew angle detection result obtained by the document skew detection section 34. Further, the document correction section 15 outputs, to the color correction section 16 and the segmentation process section 21, the image data having been subjected to the skew correction process.

Note that the image data having been subjected to the skew correction process by the document correction section 15 may be handled as filing data. In such a case, the image data is stored in the storage section 23 after compressed into a JPEG code according to a JPEG compressing algorithm. In a case where a copy output operation and/or a print output operation directed to the image data is instructed, the JPEG code is taken out from the storage section 23 and transferred to an JPEG decoding section (not shown). Subsequently, the JPEG code is subjected to a decoding process and converted to RGB data. Further, in a case where a transmission operation directed to the image data is instructed, the JPEG code is taken out from the storage section 23 and transmitted from the communication device 5 to an external device via a network or a communication line.

The color correction section 16 is for performing color correction to the RGB data so as to make color production accurate. In the color correction, color impurity is removed in accordance with spectral characteristics of a CMY (C: Cyan, M: Magenta, and Y: Yellow) color material containing an unnecessary absorption component.

The black generation and under color removal section 17 is for performing black generation in which a black (K) signal is generated from color-corrected three color signals of CMY, and subtracts the K signal from the original CMY signals so as to generate new CMY signals. In this way, the three color signals of CMY are converted into four color signals of CMYK.

The spatial filter process section 18 is for performing in accordance with the segmentation class signal the spatial filter process (edge enhancement process and/or smoothing process) by a digital filter, with respect to image data of the CMYK signals supplied from the black generation and under color removal section 17, so that a spatial frequency characteristic of the image data is corrected. This makes it possible to reduce a blur or a granularity deterioration of an output image.

In a similar manner to the spatial filter process section 18, the halftone generation section 20 performs, in accordance with the segmentation class signal, a predetermined process with respect to the image data of the CMYK signals. For example, in a region segmented into a text by the segmentation process section 21, a high frequency component is strongly sharpened by the spatial filter process performed by the spatial filter process section 18, for improvement in reproducibility of, particularly, a black text or a color text. At the same time, the halftone generation section 20 selects a binarization or multi-level dithering process in a high-resolution screen which is suitable for reproduction of the high-frequency component. Furthermore, on a region segmented into a halftone dot region by the segmentation process section 21, the spatial filter process section 18 performs a low-pass filter process for removing an input halftone dot component. Then, the output tone correction section 19 performs an output tone correction process for converting a signal, such as a density signal, to a halftone dot area ratio which is a characteristic value used by the image output apparatus 4. Subsequently, image is finally segmented into pixels by the halftone generation section 20, and then the image is subjected to a tone reproduction process (halftone generation) for reproducing each tone of the pixels. On a region segmented into a photograph region by the segmentation process section 21, a binarization or multi-level dithering process is performed by use of a screen suitable for tone reproduction.

The segmentation process section 21 performs, in accordance with the RGB signals, segmentation of each pixel of an input image into any one of a black text region, a color text region, a halftone dot region, and a photograph region (continuous tone image region). According to a result of the segmentation, the segmentation process section 21 outputs a segmentation class signal indicative of a region to which a pixel belongs, to the black generation and under color removal section 17, the spatial filter process section 18, and the halftone generation section 20.

The image file generation section 22 does not operate in the image forming mode. The image file generation section 22 is explained in detail later.

The image data having been subjected to the processes described above is temporarily stored in a memory (not shown). Then, the image data stored is read out at a predetermined timing and inputted into the image output apparatus 4.

(2-2) Image Transmission Mode

The following explains in more detail an operation of the image processing apparatus 3 in the image transmission mode, with reference to FIG. 3. Note that the respective processes performed by the A/D conversion section 11, the shading correction section 12, the input processing section 13, the document correction section 15, and the segmentation process section 21 are the same as those in the image forming mode.

The signal conversion section 31, the binarization process section 32, the resolution conversion section 33, and the document skew detection section 34 in the document detection section 14 operate substantially in the same manner as those in the image forming mode.

Figure 7:
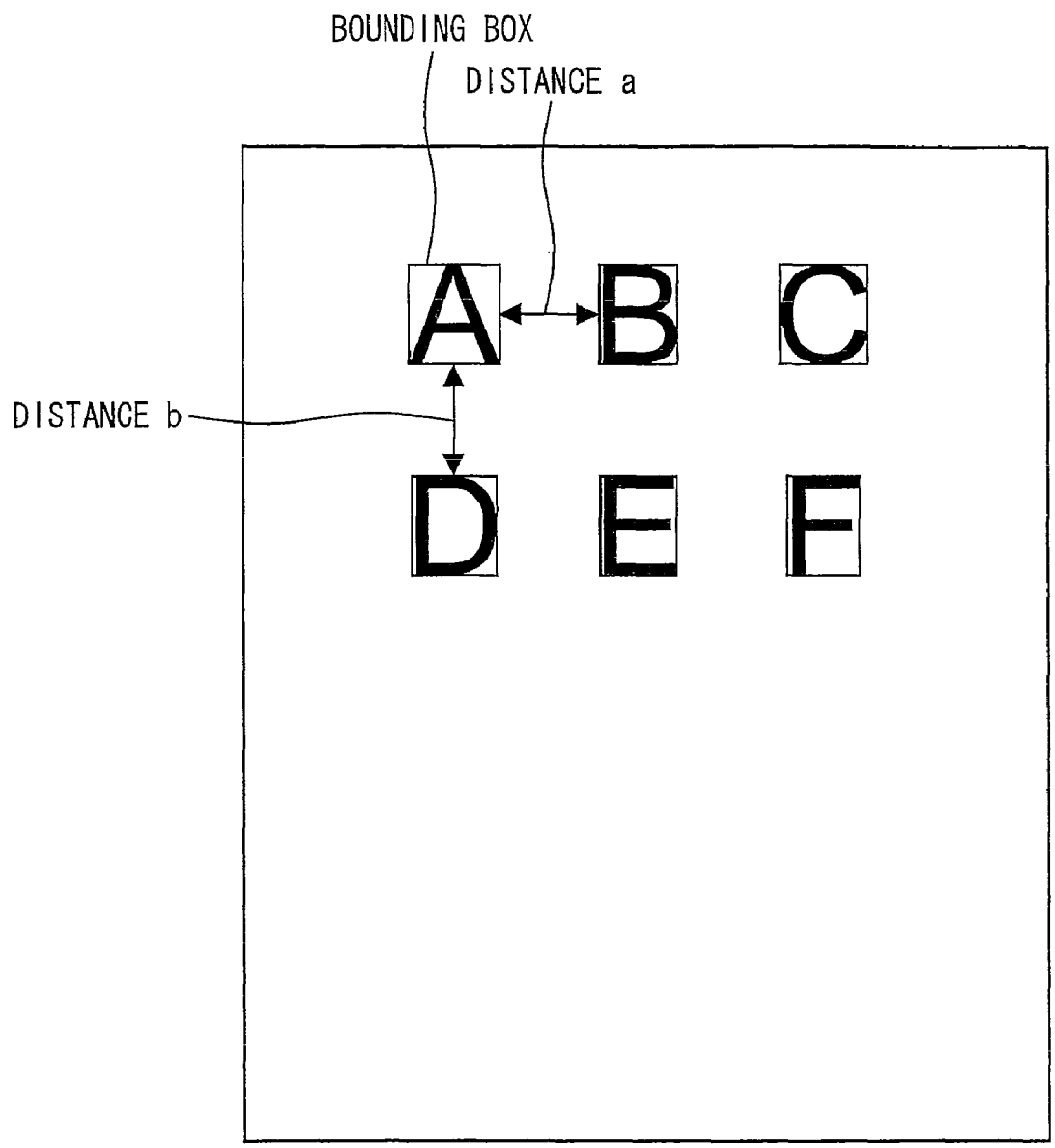
FIG. 7 is an explanatory diagram for illustrating a layout analysis process in the document detection section shown in FIG. 5.

As shown in FIG. 7, in the case of the image transmission mode, the layout analysis section 35 provided in the document detection section 14 extracts characters in the image data that have the second resolution and that are inputted from the resolution conversion section 33, and obtains bounding boxes of respective texts so as to calculate a distance between adjacent bounding boxes. Based on the distance between the adjacent bounding boxes, the layout analysis section 35 determines whether the text in the image data is in vertical writing or horizontal writing. Further, the layout analysis section 35 outputs a signal indicative a result of the determination and the image data of the first resolution to the character recognition section 41 provided in the image file generation section 22. Note that in a case where it is difficult to specifically determine whether the text is in vertical writing or horizontal writing, the layout analysis section 35 outputs, as the result of the determination, that the determination is difficult to be made.

Specifically, the layout analysis section 35 determines, for each pixel in the image data, whether or not each pixel included in the first line extending in a sub-scanning direction is a black pixel, and assigns a predetermined label to a pixel determined to be a black pixel.

Then, regarding a second line adjacent in a main scanning direction to the first line to which labeling has been carried out, the layout analysis section 35 determines, for each pixel in the second line, whether each pixel in the second line is a black pixel or not. Then, the layout analysis section 35 assigns, to each pixel determined to be a black pixel in the second line, a label different from the label used in the first line for which labeling has been completed. Then, for each pixel determined to be a black pixel in the second line, it is determined whether an adjacent pixel that is in the first line for which labeling has been completed and that is adjacent to the pixel determined to be a black pixel in the second line is a black pixel or not. If the adjacent pixel in the first line is determined to be a black pixel, the layout analysis section 35 determines that black pixels are continuous, and changes the label of the pixel in the second line to the label (the label that is the same as the label for the first line one line above the second line) of the adjacent pixel that is adjacent to the pixel in the second line and that is in the first line for which labeling has been completed.

Subsequently, the process above is repeated for each line aligned in the main scanning direction. Then, the layout analysis section 35 extracts pixels to which the same label is assigned, thereby extracting each character.

Then, a bounding box of the each character extracted is calculated. Note that coordinates of each bounding box of the each character are calculated, for example, on the assumption that a top-leftmost position of the image data is an origin.

Note that the layout analysis section 35 may be configured to perform a layout recognition process for each region in the document. For example, the layout analysis section 35 may be configured to extract regions each made of a group of characters for which each distance between bounding boxes is substantially equal, and to determine whether the text is in vertical writing or horizontal writing by performing the layout recognition process for each region extracted.

The color correction section 16 converts, into R'G'B' image data (e.g., sRGB data), the RGB image data inputted from the document correction section 15. The R'G'B' image data conforms to the display characteristics of a commonly-used display device. Then, the color correction section 16 outputs the R'G'B' image data to the black generation and under color removal section 17. In the regular transmission mode, the black generation and under color removal section 17 directly outputs (without subjecting the image data to any process), to the spatial filter process section 18, the image data inputted from the color correction section 16.

The spatial filter process section 18 performs, by a digital filter, a spatial filter process (edge enhancement process or smoothing process) on the R'G'B' image data inputted from the black generation and under color removal section 17, in accordance with the segmentation class signal, and outputs the processed R'G'B' image data to the output tone correction section 19. In the regular transmission mode, the output tone correction section 19 directly outputs (without subjecting the processed R'G'B' image data to any process), to the halftone generation section 20, the processed R'G'B' image data inputted from the spatial filter process section 18.

Figure 8:
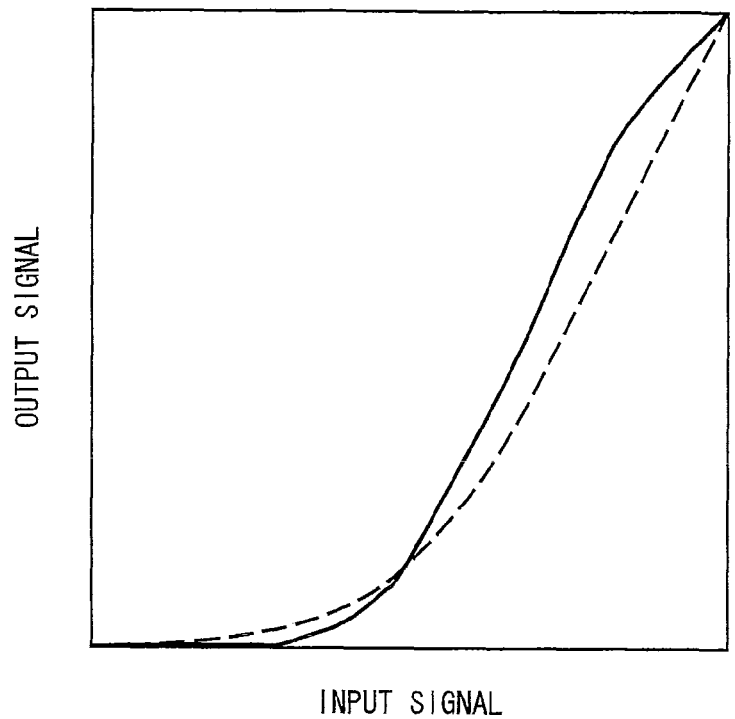
FIG. 8 is a graph illustrating one example of a gamma curve employed in a halftone correction process in the image processing apparatus shown in FIG. 2.

The halftone generation section 20 performs a predetermined process on the R'G'B' image data inputted from the output tone correction section 19, in accordance with the segmentation class signal, and then outputs the processed R'G'B' image data to the image file generation section 22. For example, the halftone generation section 20 performs, on the text region, correction using a gamma curve as shown by a solid line in FIG. 8, and performs, on a non-text region, correction using a gamma curve as shown by a dotted line in FIG. 8. It is preferable, for example, to set: (i) for non-text regions, a gamma curve corresponding to display characteristics of an image display device provided to the external device of the destination; and (ii) for the text region, a gamma curve for texts to be sharply displayed.

The R'G'B' image data outputted from the halftone generation section 20 is inputted into the formatting process section 43 of the image file generation section 22.

The image file generation section 22 includes the character recognition section 41, a draw command generation section 42, and a formatting process section 43.

The character recognition section 41 extracts features of a character included in the image data based on the image data of the second resolution inputted from the document detection section 14. Then, the character recognition section 41 performs character recognition by comparing a result of the extraction with features of characters included in dictionary data, and finds a text code corresponding to a character having similar features. Further, based on the result of the determination by the layout analysis section 35 (whether the text is in vertical writing or horizontal writing), the character recognition section 41 performs a recognition process for a word formed by adjacent characters. That is, by matching a combination of adjacent characters and word data in the dictionary data, the character recognition section 41 performs a recognition process of a word on the document. Then, the character recognition section 41 outputs, to the draw command generation section 42, a recognition result of each character and each word as a character recognition result.

Note that in the present embodiment, the character recognition section 41 determines how similar the features extracted from each character in the image data and the features of the characters included in the dictionary data are (a degree of similarity of the features), by comparing the features extracted from each character in the image data and the features of the characters included in the dictionary data. Then, in a case where the characters in the dictionary data includes a plurality of characters each having a degree of similarity equal to or more than a predetermined value with respect to a character in the image data, the character recognition section 41 outputs, as character recognition results, the text codes of the plurality of texts to the draw command generation section 42.

For example, in a case where: (i) a possible value of the degree of similarity is in a range of 0 to 1 and the predetermined value is set to 0.8 and (ii) the characters in the dictionary data includes characters having respective degrees of similarity of (0.726), (0.891), (0.931), (0.776) and (0.722) with respect to a character included in the image data, characters corresponding to the respective degrees of similarity of (0.891) and (0.931) are detected as the character recognition results.

Note that in a case where the characters in the dictionary data includes a character whose degree of similarity to a character in the image data is different by less than a predetermined value from a degree of similarity (the maximum value) of a character that is in the dictionary and that is the most similar to the character in the image data, text codes of both the character of the maximum value and the character whose degree of similarity is different by less than the predetermined value may be outputted as the character recognition results to the draw command generation section 42.

For example in a case where: (i) a possible value of the degree of similarity is in a range of 0 to 1 and the predetermined value is set to 0.2 and (ii) the characters in the dictionary data includes characters having respective degrees of similarity of (0.726), (0.891), (0.931), (0.776) and (0.722) with respect to a character included in the image data, the character recognition section 41 detects, as the character recognition results, the character corresponding to the maximum degree of similarity of (0.931), and the characters respectively corresponding to the degree of similarity of (0.891) and the degree of similarity of (0.776) that are different from the maximum similarity by less than 0.2.

Figure 9:
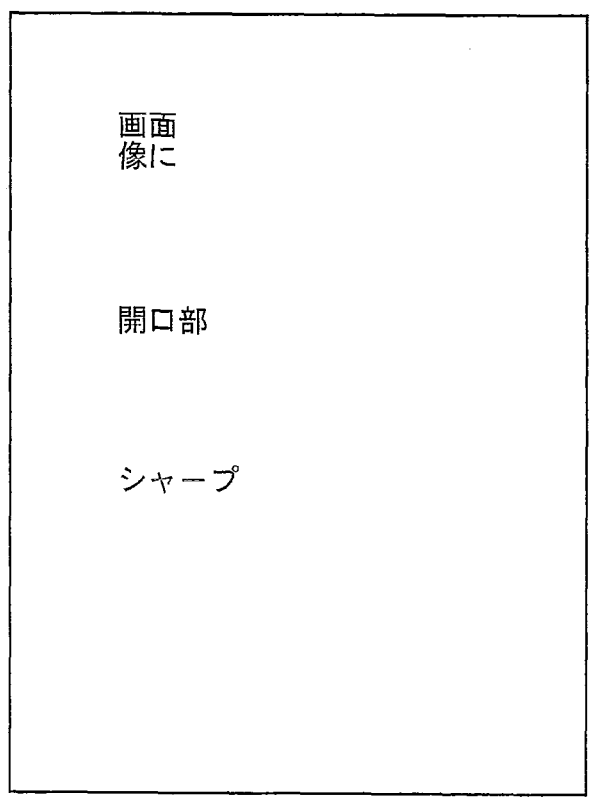
FIG. 9 is explanatory diagram illustrating one example of a document read by the image input apparatus shown in FIG. 4.

According to this, as shown in FIG. 9, for example, in a case where the document includes a text string of " 開口部 (kaikobu (aperture section)) (in Chinese characters of Japanese, that is, alphabets in one type of writing system among three types of Japanese writing systems (Hiragana, Katakana, and Chinese characters)", two character recognition results are detected for the character of " 口 (kou)". The two character recognition results are a character of " 口 (kou)" in a Chinese character and a character of " ロ (ro)" in Katakana (an alphabet in another type of Japanese writing system). Further, in a case where, as shown in FIG. 9, the document includes a text " シャープ (syapu (sharp)) (in Katakana)", two character recognition results are detected for "—". The two character recognition results "—" that is a prolonged sound symbol in katakana and "一 (ichi (one))" in a Chinese numeral (numeral in Chinese character).

Moreover, the character recognition section 41 performs a recognition process of a word formed by adjacent characters, based on a determination result (whether the text is in vertical writing or horizontal writing) of the layout analysis section 35.

For example, in a case where the determination result of the layout analysis section 35 indicates horizontal writing and, as shown in FIG. 9, the document includes a text string " 開口部 (kaikobu (aperture section))", two words that are " 開口部 (kaikoubu (aperture section))" and " 開口部 (kairobu)" are detected. Similarly, in a case where the determination result of the layout analysis section 35 indicates horizontal writing and, as shown in FIG. 9, the document includes a text string " シャープ (syapu (sharp)) (in Katakana)", two words that are " しゃーぷ (syapu (sharp))" and " しゃいちぷ (syaichipu)" are detected.

Meanwhile, in a case where the determination result of the layout analysis section 35 indicates that it is difficult to specifically determine whether the text is in vertical writing or in horizontal writing, the character recognition section 41 performs word detection in two ways, that is, for a case where the text is in vertical writing and for a case where the text is in horizontal writing. For example, in a case where, as shown in FIG. 9, the document includes the following texts:
画面 (gamen (screen)); and
像に (zouni (to an image)),
the character recognition section 41 detects two sets of words, one set including " がめん (gamen (screen))" and " ぞうに (zouni (to an image))" (words detected in a case horizontal writing is assumed) and another set including " がぞう (gazou (image))" and " めんに (menni (to a surface))" (in a case where vertical writing is assumed).

Note that a calculation method of a degree of similarity is not specifically limited, but various conventionally known methods may be used.

The draw command generation section 42 generates a command for setting, in the image file, transparent text data in accordance with the character recognition result obtained by the character recognition section 41. Here, the transparent text data is data to be superimposed on (or embedded into) the image data so as to appear invisible. This data allows recognized characters and words to be superimposed as text information. For example, in the case of a PDF file, an image file in which the transparent text data is added to the image data is typically used.

The formatting process section 43 generates an image file of a predetermined format, by embedding, into the image data inputted from the halftone generation section 20, the transparent text data in accordance with the command inputted from the draw command generation section 42. Then, the formatting process section 43 outputs the generated image file to the communication device 5. In the present embodiment, the formatting process section 43 generates a PDF image file. Not that a format of the image file is not limited to a PDF file but may be in any format as long as the transparent text data can be embedded in the image data.

Figure 10:
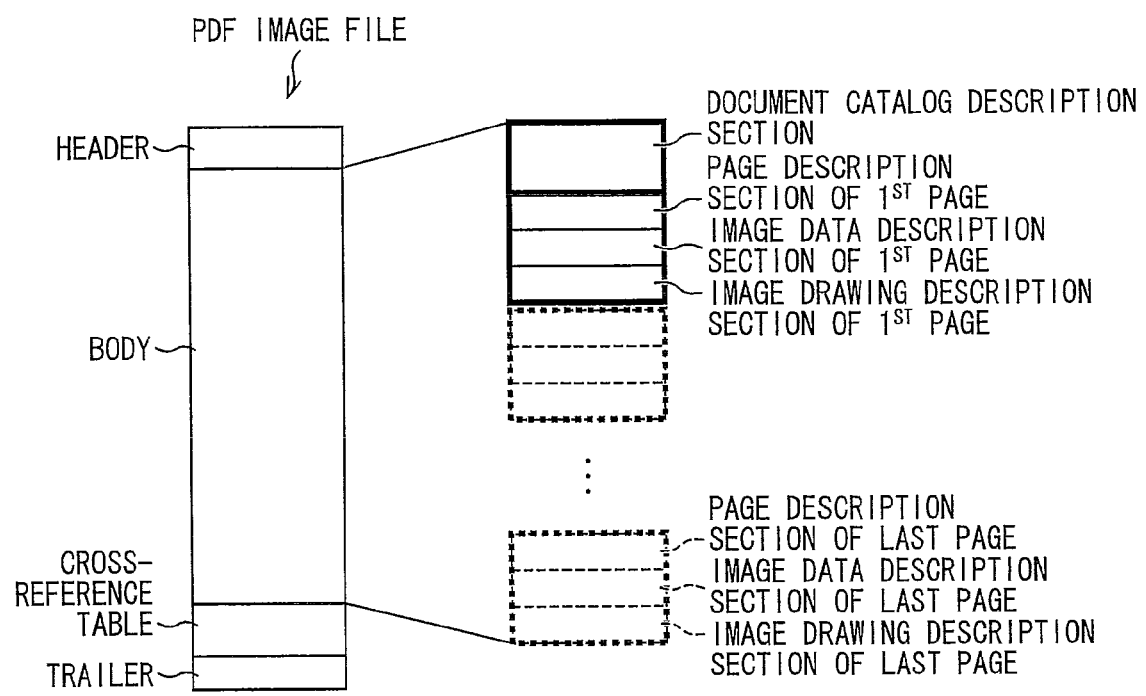
FIG. 10 is an explanatory diagram illustrating a configuration of an image file transmitted in an image transmission mode in the image processing apparatus shown in FIG. 2.

FIG. 10 is an explanatory diagram illustrating a configuration of a PDF image file generated by the formatting process section 43. As shown in FIG. 10, the image file is includes a header section, a body section, a cross-reference table, and a trailer section.

The header section includes a version number and a text string indicating that the file is a PDF file. The body section includes, for example, information to be displayed and page information. The cross-reference table includes a description of address information for making an access to contents of the body section. The trailer section includes a description of, for example, information indicating where to start reading.

The body section is made of a document catalogue description section, a page description section, an image data description section, and an image drawing description section. In the document catalog description section, cross-reference information with respect to an object constituted by each page is described. In the page description section, information regarding a display area for each page or the like is described. In the image drawing description section, a condition to be applied at the time when a corresponding page is drawn is described. Note that the page description section, the image data description section, and the image drawing description section are provided so as to correspond to each page.

FIG. 11 illustrates an example of a description for the image data description section in a case where the character recognition result detected from the document shown in FIG. 9 is embedded as transparent text data in the image data. As shown in FIG. 11, in a case where a plurality of character recognition results are detected with respect to one character, the plurality of character recognition results (character codes) are described in association with coordinates corresponding to the character. Further, in a case where it is not clear whether the text is in vertical writing or horizontal writing, both a word detected on an assumption that the text is in vertical writing and a word detected on an assumption that the text is in horizontal writing are described in association with coordinates of a corresponding text string.

The communication device 5 transmits, to an external device communicably connected via a network, the image file that is inputted from the formatting process section 43. For example, the communication device 5 attaches the image file to an e-mail by using a mail process section (job device) (not shown), and transmits the image file.

(2-3) Brief Description of Processes in Image Processing Apparatus 3

Figure 1:
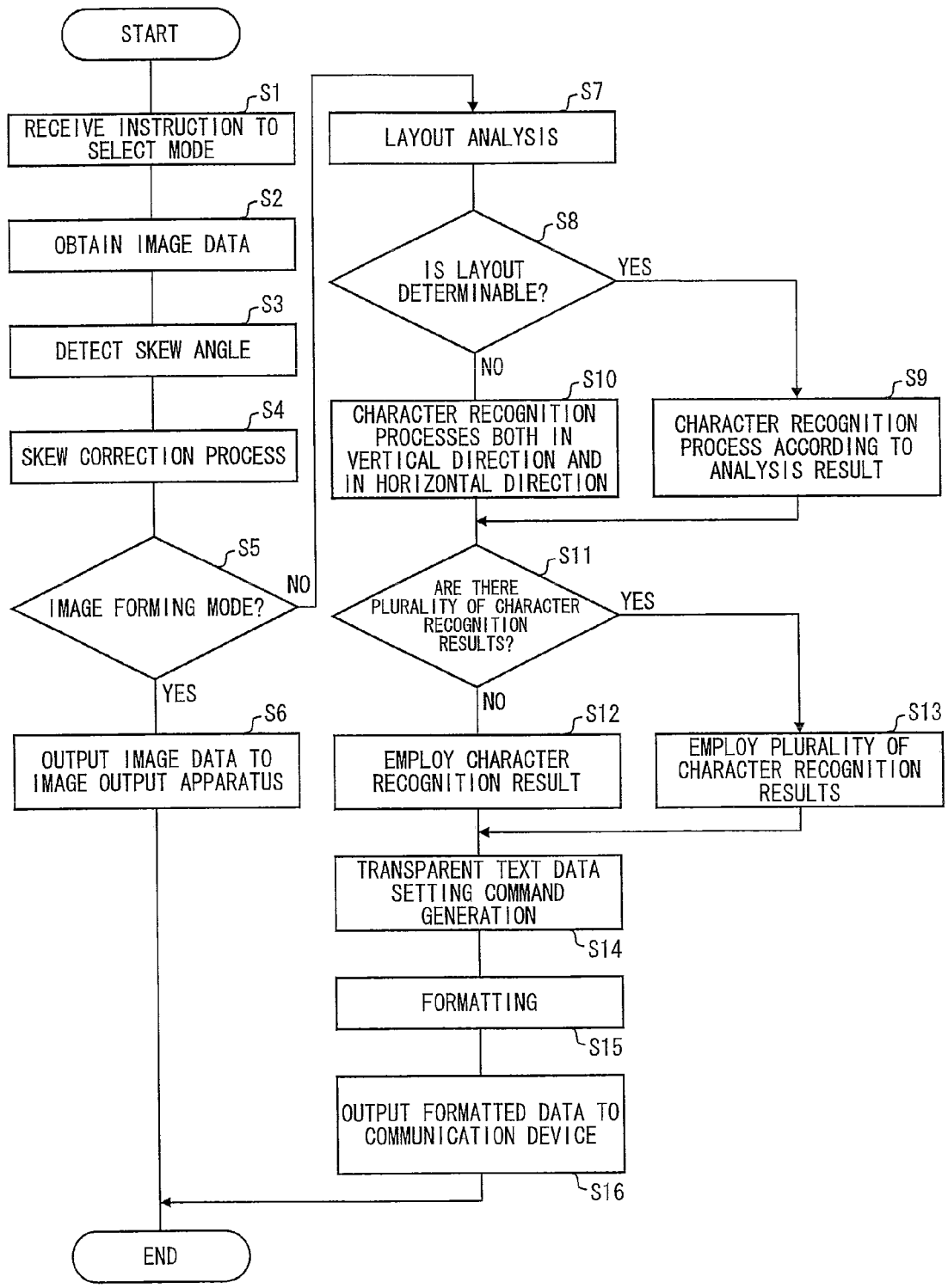
FIG. 1 is a flow chart illustrating a process flow in an image processing apparatus according to one embodiment of the present invention.

FIG. 1 is a flow chart schematically illustrating a process flow in the image processing apparatus 3. As shown in FIG. 1, first, the control section 24 receives an instruction to select a process mode from a user (S1). This instruction is inputted from the operation panel 6. Further, the control section 24 obtains, from the image input apparatus 2, image data obtained by reading a document (S2).

Then, the control section 24 causes the document detection section 14 to perform a skew angle detection process (S3) and then causes the document correction section 15 to perform a skew correction process in accordance with a detection result of the skew angle (S4).

Subsequently, the control section 24 determines whether or not the process mode instructed to select in S1 is the image forming mode (S5). In a case where the control section 24 determines that the image forming mode is selected, a predetermined process is performed on the image data having been subjected to the skew correction process. Then, the control section 24 causes the image data to be outputted to the image output apparatus 4 (S6) and ends processing.

Meanwhile, in a case where the control section 24 determines in S5 that the process mode instructed is not the image forming mode, the control section 24 determines that the process mode instructed to select in S1 is the image transmission mode. Then, the control section 24 causes the layout analysis section 35 of the document detection section 14 to carry out a layout analysis (a process for analyzing whether the text direction of the document image is in a vertical direction (vertical writing) or a horizontal direction (horizontal writing)) (S7). Subsequently, the control section 24 determines whether or not a layout (whether the text is in vertical writing or horizontal writing) is determinable (S8).

In a case where the control section 24 determines in S8 that the layout is determinable, the control section 24 causes the character recognition section 41 to perform a character recognition process in accordance with the text direction according to an analysis result obtained by the layout analysis section 35 (S9). On the other hand, in a case where the control section 24 determines in S8 that the layout is indeterminable, the control section 24 causes the character recognition section 41 to perform the character recognition process in both the vertical direction and the horizontal direction (S10).

Subsequently, the control section 24 determines whether or not a plurality of character recognition results are detected or not for each character included in the document (S11). Then, in a case where there is only one character recognition result, the control section 24 employs this character recognition result (S12). Whereas, in a case where there are a plurality of character recognition results, the control section 24 employs the plurality of character recognition results (S13).

Then, the control section 24 causes the draw command generation section 42 to generate a setting command of the transparent text data for embedding, in the image data, the transparent text data in accordance with the character recognition result (S14), and also causes the formatting process section 43 to generate (to format) an image file of a predetermined format for the image data in which the transparent text data is embedded (S15). Consequently, the control section 24 transmits the formatted image file to an external device via the communication device 5 (S16) and ends processing.

As described above, the digital color multifunction printer 1 performs the character recognition process based on the image data read from the document. In a case where a plurality of possible character recognition results are detected, text data each corresponding to each possible character recognition result is generated. Then, the text data is embedded as transparent text data in the image data.

This makes it possible to prevent omission in a keyword search in a case where the keyword search is performed based on the transparent text data embedded in the image data.

FIGS. 12(a) to 12(f) are explanatory diagrams each illustrating an example of a search result in a case where a keyword search process is performed with respect to the image file generated in accordance with the image data read from the document shown in FIG. 9.

Figure 12:
FIG. 12(a) is an explanatory diagram illustrating a result of a keyword search on an image file generated in the image processing apparatus shown in FIG. 2.
FIG. 12(b) is an explanatory diagram illustrating a result of a keyword search on an image file generated in the image processing apparatus shown in FIG. 2.
FIG. 12(c) is an explanatory diagram illustrating a result of a keyword search on an image file generated in the image processing apparatus shown in FIG. 2.
FIG. 12(d) is an explanatory diagram illustrating a result of a keyword search on an image file generated in the image processing apparatus shown in FIG. 2.
FIG. 12(e) is an explanatory diagram illustrating a result of a keyword search on an image file generated in the image processing apparatus shown in FIG. 2.
FIG. 12(f) is an explanatory diagram illustrating a result of a keyword search on an image file generated in the image processing apparatus shown in FIG. 2.
Figure 12:
Figure 12:
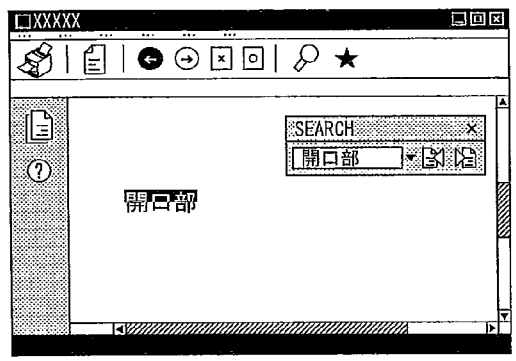
Figure 12:
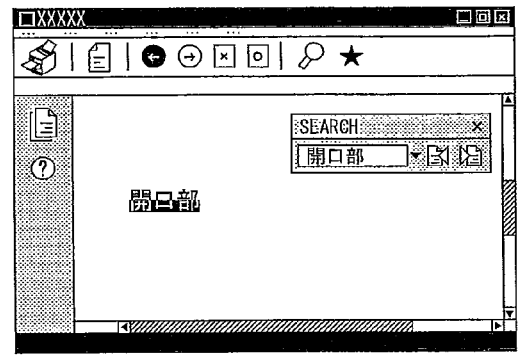
Figure 12:
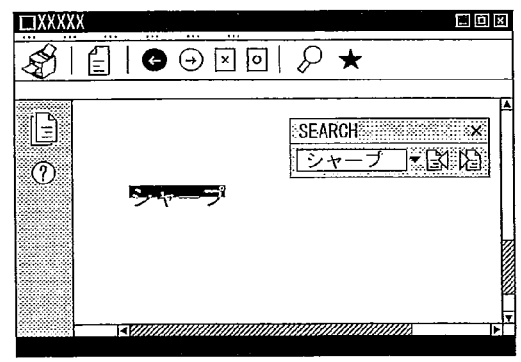
Figure 12:
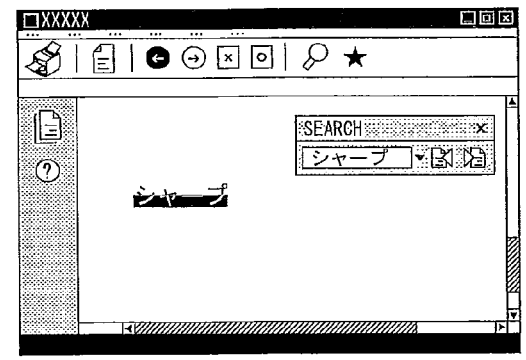

In the present embodiment, both a word detected on the assumption that the text is in horizontal writing and a word detected on the assumption that the text is in vertical writing are embedded as transparent text data in the image data. Therefore, as shown in FIGS. 12(a) and 12(b), a corresponding text string is extracted both in a case where a keyword is "画面 (gamen (screen))" and in a case where the keyword is "画像 (gazou (image))".

In the present embodiment, in a case where a plurality of character recognition results are detected with respect to one character, the plurality of character recognition results are embedded as transparent text data in the image data. Accordingly, as shown in FIGS. 12(c) and 12(d), regarding the text string "開口部 (kaikoubu (aperture section))", this text string "開口部 (kaikoubu (aperture section))" is extracted both in a case where the keyword is "開口部 (kaikoubu (aperture section))" and in a case where the keyword is "開口部 (kairobu)". Similarly, as shown in FIGS. 12(e) and 12(f), regarding a text string "シャープ (syapu (sharp))", this text string "シャープ (syapu (sharp))" is extracted both in a case where the keyword is "しゃーぶ (syapu (sharp))" and in a case where the keyword is "しゃいちぶ (syaichipu)".

In the present embodiment, the document detection section 14 is configured to output, to the image file generation section 22, binarized image data whose resolution is reduced. However, the configuration of the present invention is not limited to this. For example, the configuration may be as follows, as shown by a dotted line in FIG. 3. That is, the document correction section 15 may output, to the image file generation section 22, the image data obtained by subjecting the binarized image data whose resolution is reduced to the skew correction process, and the character recognition section 41 of the image file generation section 22 may perform the character recognition process by using the image data having been subjected to the skew correction. This makes it possible to improve accuracy of the character recognition, as compared with a case where the character recognition is performed by using the image data that has not been subjected to the skew correction.

Further, in the present embodiment, the character recognition is performed by using the image data that is converted to a black-and-white binary value (luminance signal) by the document detection section 14 and whose resolution is converted to a low resolution (e.g., 300 dpi) by the document detection section 14. This makes it possible to appropriately perform the character recognition process even in a case where a text size is relatively large. Note that the resolution of the image for use in the character recognition process is not limited to the above example.

Further, the present embodiment explains, as an example, a case where the formatting process section 43 generates a PDF image file. However, a format of the image file is not limited to this, but may be in any format as long as the image data and the text data are associated with each other. For example, it is possible to generate an image file in which the text data is in an invisible state and only the image data is in a visible state, by first setting the text data in a format of presentation software or the like and then superimposing the image data on the text data.

The present embodiment explains a case where the image data in which the transparent text data is embedded is transmitted to an external device via the communication device 5. However, the configuration of the present invention is not limited to this. For example, the configuration of the present invention may be such that the image data in which the transparent text data is embedded is stored in a storage section included in the digital color multifunction printer 1 or a storage section detachably provided to the digital color multifunction printer 1.

Figure 13:
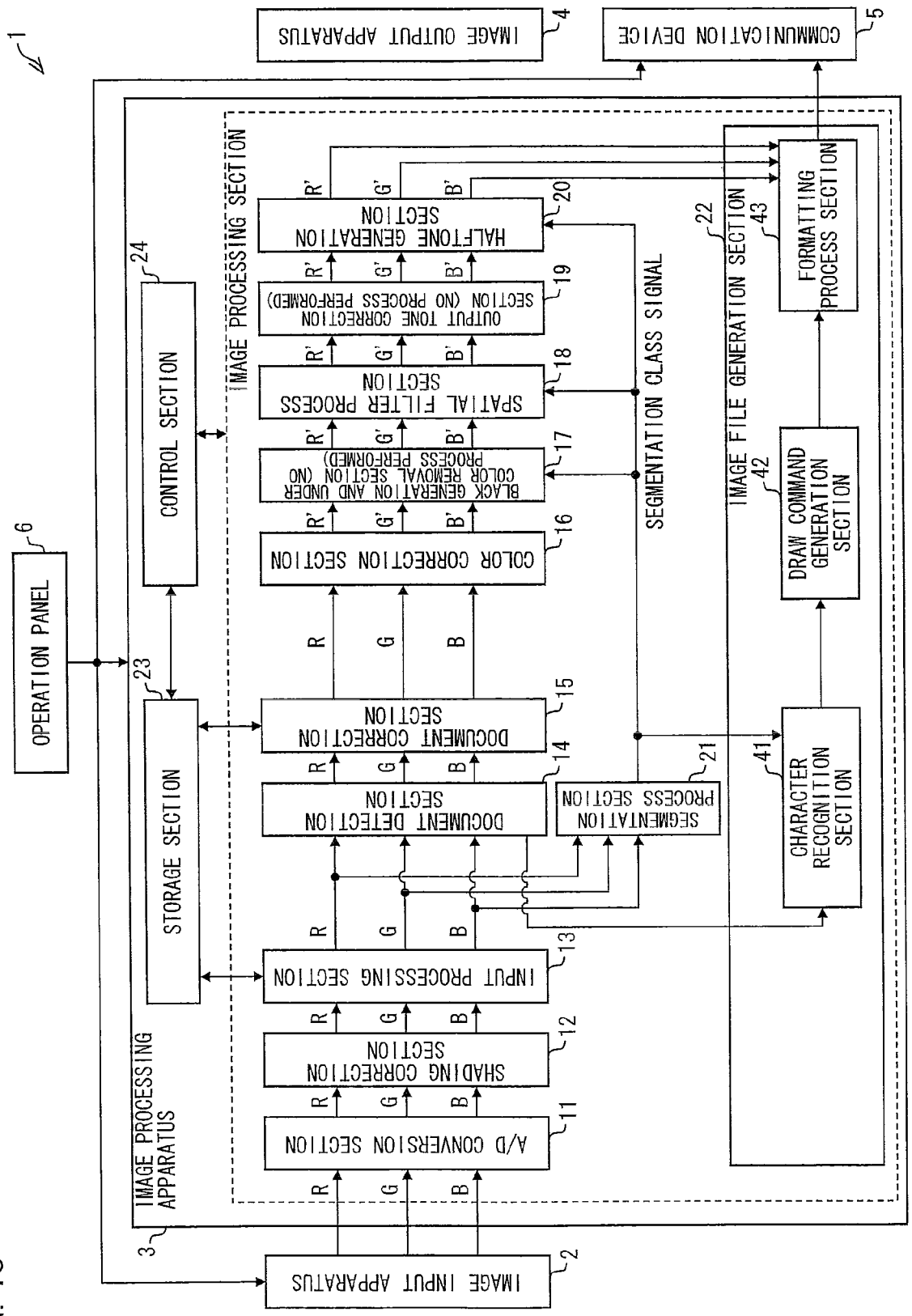
FIG. 13 is a block diagram illustrating a modified example of the image processing apparatus shown in FIG. 2.

Further, the present embodiment is configured such that the character recognition section 41 receives, from the document detection section 14 or the document correction section 15, the binarized data whose resolution is reduced, and the character recognition process is performed by using this binarized data. However, the configuration of the present invention is not limited to this. For example, as shown in FIG. 13, the character recognition process may be configured as follows. That is, first, the segmentation class signal outputted from the segmentation process section 21 is inputted into the character recognition section 41. Then, based on this segmentation class signal, the character recognition section 41 generates a text map indicative of a text region (an image region made of pixels determined to be a text edge) and carries out the character recognition process only on the text region.

Figure 14:
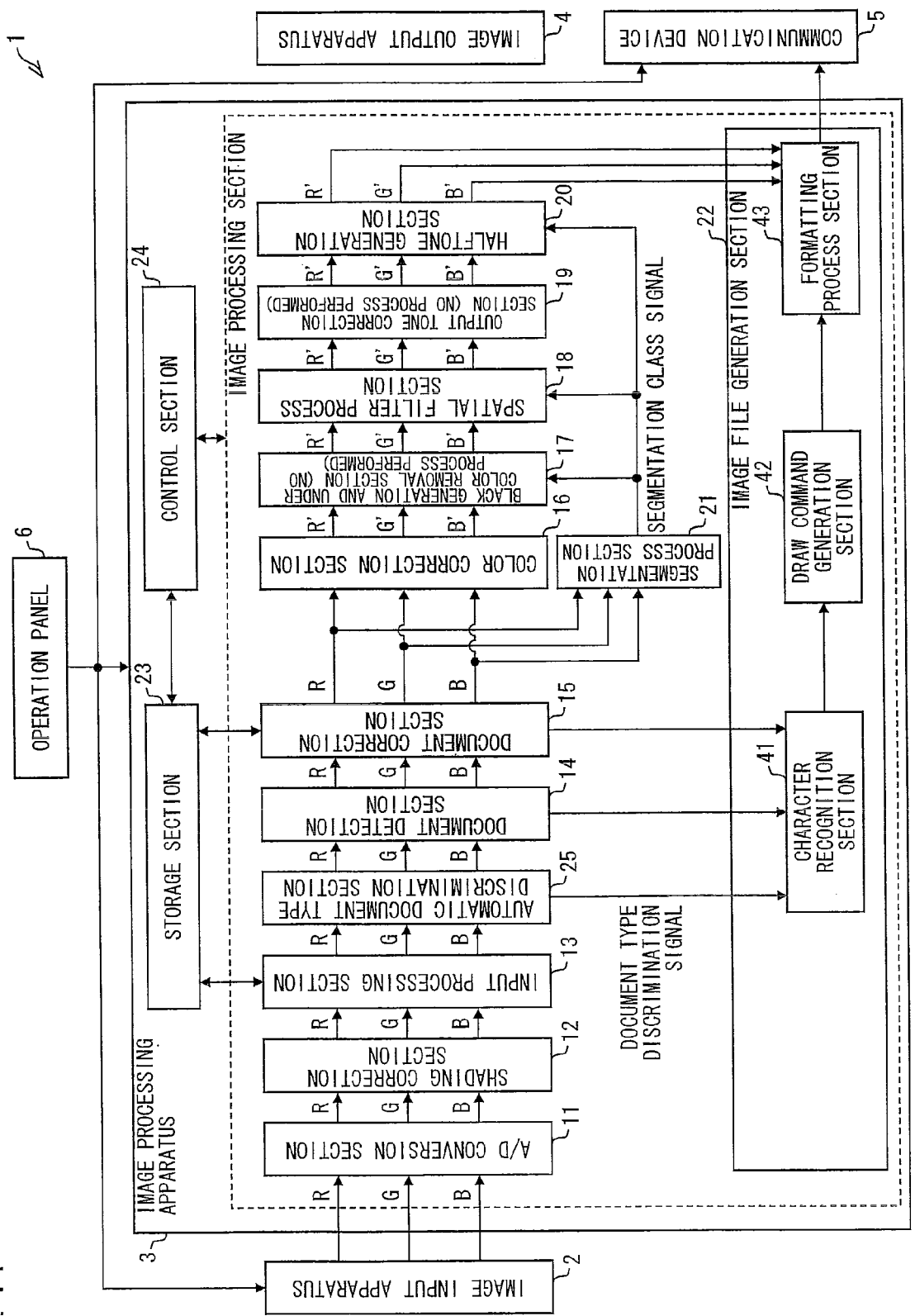
FIG. 14 is a block diagram illustrating a modified example of the image processing apparatus shown in FIG. 2.

Alternatively, as shown in FIG. 14, the configuration may be as follows. That is, an automatic document type discrimination section 25 for discriminating a type of a document according to image data is provided. The automatic document type discrimination section 25 outputs a document type discrimination signal, which is then inputted into the character recognition section 41. Then, the character recognition section 41 performs the character recognition process based on the binarized image data which is inputted from the document detection section 14 or the document correction section 15 and whose resolution is reduced only in a case where the document type discrimination signal indicates a document (e.g., a text document, a text/printed-picture document and a text/photograph document) containing a character. A discrimination method of a document type in the automatic document type discrimination section 25 may be any method as long as at least a document containing a text and a document containing no text can be discriminated by the method. For the discrimination method, various conventionally known methods may be used.

The present embodiment explains a case where the present invention is applied to a digital color multifunction printer. However, the application is not limited to this. For example, the present invention may be applied to a monochrome multifunction printer. Further, the present invention may be applied to, for example, a single-function image reading apparatus other than the multifunction printer.

Figure 15:
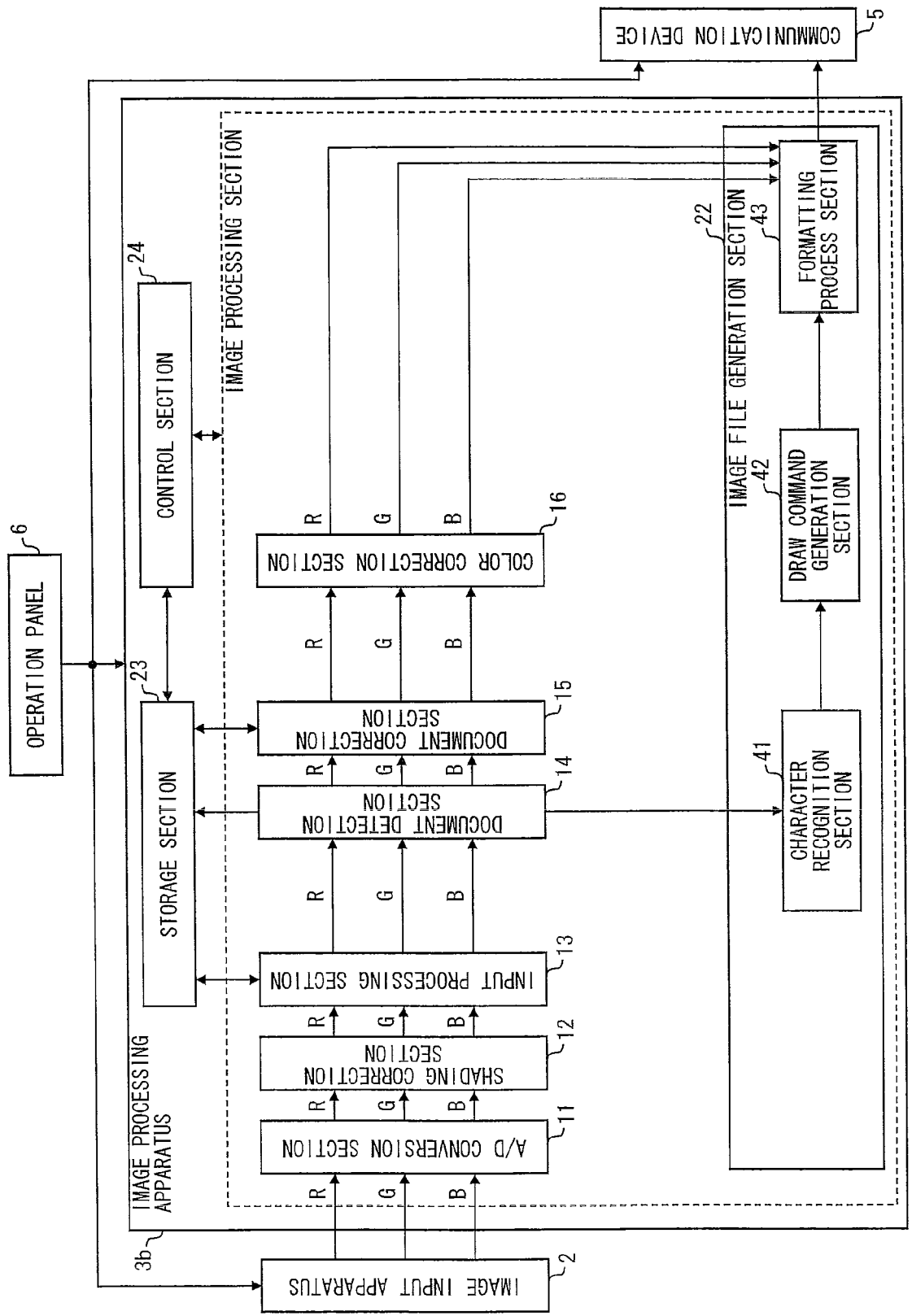
FIG. 15 is a block diagram illustrating a modified example of the image processing apparatus shown in FIG. 2.

FIG. 15 is a block diagram illustrating an example of a configuration in a case where the present invention is applied to an image reading apparatus. An image reading apparatus 100 shown in FIG. 15 includes an image input apparatus 2, an image processing apparatus 3b, a communication device 5, and an operation panel 6. Respective functions and configurations of the image input apparatus 2, the communication device 5, and the operation panel 6 are substantially the same as those of the digital color multifunction printer 1 described above, and explanations thereof are omitted here.

The image processing apparatus 3b includes an A/D conversion section 11, a shading correction section 12, an input processing section 13, a document detection section 14, a document correction section 15, a color correction section 16, an image file generation section 22, a storage section 23, and a control section 24. Further, the image file generation section 22 includes a character recognition section 41, a draw command generation section 42, and a formatting process section 43.

The members above provided in the image processing apparatus 3b has functions substantially the same as those in the digital color multifunction printer 1 describe above, except that: the image forming mode is not included; and the image data having been subjected to the color correction process by the color correction section 16 is outputted to the formatting process section 43 and the formatting process section 43 generates, in accordance with the image data inputted from the color correction section 16, an image file to be transmitted to an external device. The image file generated through the processes as described above in the image processing apparatus 3b is transmitted, by the communication device 5, to, for example, a computer or a server communicably connected via a network.

In the present embodiment, each block in the digital color multifunction printer 1 or the image reading apparatus 100 may be realized by software by using a processor such as a CPU. In such a case, the digital color multifunction printer 1 or the image reading apparatus 100 includes a CPU (central processing unit) that executes the order of a control program for realizing the aforesaid functions, a ROM (read only memory) that stores the control program, a RAM (random access memory) that develops the control program in an executable form, and a storage device (storage medium), such as a memory, that stores the control program and various types of data therein. With this arrangement, the object of the present invention is realized by a predetermined storage medium. The storage medium stores, in a computer-readable manner, program codes (executable code program, intermediate code program, and source program) of the control program of the digital color multifunction printer 1 or the image reading apparatus 100 of the present invention, each of which is software for realizing the aforesaid functions. The storage medium is provided to the digital color multifunction printer 1 or the image reading apparatus 100. With this arrangement, the digital color multifunction printer 1 or the image reading apparatus 100 (alternatively, CPU or MPU) as a computer reads out and executes the program code stored in the storage medium provided.

The storage medium may be a tape such as a magnetic tape or a cassette tape; a disc such as a magnetic disk including a Floppy® disc and a hard disk, and an optical disk including a CD-ROM, an MO, an MD, a DVD, and a CD-R; a card such as an IC card (including a memory card) and an optical card; or a semiconductor memory, such as a mask ROM, an EPROM, an EEPROM, and a flash ROM.

Further, the digital color multifunction printer 1 or the image reading apparatus 100 of the present invention may be arranged so as to be connectable to a communications network so that the program code is supplied to the digital color multifunction printer 1 or the image reading apparatus 100 through the communications network. The communications network is not to be particularly limited. Examples of the communications network include the Internet, an intranet, an extranet, LAN, ISDN, VAN, a CATV communications network, a virtual private network, a telephone network, a mobile communications network, and a satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and infrared ray used in remote control, Bluetooth®, 802.11, HDR, a mobile phone network, satellite connections, and a terrestrial digital network. Note that the present invention can be also realized by the program codes in the form of a computer data signal embedded in a carrier wave which is embodied by electronic transmission.

Each block of the digital color multifunction printer 1 or the image reading apparatus 100 is not limited to the block realized by software, but may be constituted by hardware logic or a combination of (i) hardware performing a part of the processes and (ii) operation means executing software performing control of the hardware and the rest of the processes.

As described above, an image processing apparatus of the present invention includes: a character recognition section for performing a character recognition process for a character included in a document, based on image data obtained by reading the document; and an image file generation section for generating an image file in which text data obtained by the character recognition process are associated with the image data, the character recognition section generating the text data corresponding respectively to a plurality of possible character recognition results, in a case where the character recognition section detects the plurality of possible character recognition results, the image file generation section generating the image file in which each of the text data produced by the character recognition section is associated with the image data.

An image processing method of the present invention includes the steps of: performing a character recognition process for a character included in a document, based on image data obtained by reading the document; and generating an image file in which text data obtained by the character recognition process are associated with the image data, wherein: in the step of performing the character recognition process, the text data corresponding respectively to a plurality of possible character recognition results are generated in a case where the character recognition section detects the plurality of possible character recognition results; and in the step of generating the image file, the image file in which each of the text data produced in the step of performing the character recognition process is associated with the image data is generated.

According to the image processing apparatus and the image processing method, in a case where the plurality of possible character recognition results are detected, each of the text data corresponding to each of the plurality of possible character recognition results is produced. Then, the image file is generated so that each of the text data is associated with the image data. This makes it possible to include each possible character recognition result in objects for search even in a case where the plurality of possible character recognition results are present. This makes it possible to prevent omission in search.

Further, the image processing apparatus of the present invention may be configured such that the character recognition section generates the text data corresponding respectively to a plurality of characters, in a case where the plurality of characters are detected as the plurality of possible character recognition results with respect to one character; and the image file generation section generates the image file in which each of the text data produced by the character recognition section is associated with the image data.

According to the configuration, in a case where a plurality of characters are detected, as possible character recognition results, with respect to one character, the image file is generated so that each of the text data corresponding to each of the plurality of characters is associated with the image data. This makes it possible to perform a search including the possible character recognition results for the character for which the plurality of possible character recognition results are present, in a case where a keyword search is performed by use of the image file generated. Therefore, omission in search can be prevented.

The image processing apparatus of the present invention may further include: a layout analysis section for analyzing, based on the image data, whether a word or a sentence described in the document is in vertical writing or horizontal writing, the character recognition section carrying out both a character recognition process for horizontal writing and a character recognition process for vertical writing and generating the text data corresponding respectively to character recognition results for the character recognition process for horizontal writing and the character recognition process for vertical writing, in a case where it is indeterminable by use of the layout analysis section whether the word or the sentence described in the document is in vertical writing or in horizontal writing, the image file generation section generating the image file in which each of the text data produced by the character recognition section is associated with the image data.

According to the configuration, in a case where it is indeterminable whether a word or a sentence written in a document is in vertical writing or horizontal writing, the image file is generated so that each of the text data corresponding to each of results of an image recognition process corresponding to vertical writing and an image recognition process corresponding to horizontal writing are associated with the image data. This makes it possible to prevent omission in search at the time when a keyword search is performed by use of the image file generated, even in a case where it is indeterminable whether the word or the sentence described in the document is in vertical wiring or horizontal wiring.

The image processing apparatus of the present invention may be configured such that: the character recognition section performs a recognition process of the word included in the document, based on the character recognition result for each character included in the image data and an analysis result of the layout analysis section; the character recognition section produces the text data corresponding respectively to a word detected in the recognition process of the word on an assumption of vertical writing and a word detected in the recognition process of the word on an assumption of horizontal writing, in a case where it is indeterminable by the layout analysis section whether the word or the sentence described in the document is in vertical writing or the horizontal writing; and the image file generation section generates the image file in which each of the text data produced by the character recognition section is associated with the image data.

According to the configuration, in a case where it is indeterminable whether the word or the sentence written in the document is in vertical writing or horizontal writing, the image file is generated so that each of the text data corresponding to each of a word detected in an image recognition process corresponding to vertical writing and a word detected in an image recognition process corresponding to horizontal writing is associated with the image data. This makes it possible to prevent omission in search at the time when a keyword search is performed by use of the image file generated even in a case where it is indeterminable whether or not the word or the sentence written in the document is in vertical writing or horizontal writing.

The image file generation section may be configured to associate, in the image file, the text data with a position of the character on the document, the character corresponding to the text data in the image data. For example, the image file generation section may be configured to set the text data as transparent text data in a position corresponding to the position of the character on the document, the character corresponding to the text data in the image data.

According to the configuration, it is possible to specify a character image corresponding to a character detected in the keyword search with a use of the image file generated.

An image reading apparatus of the present invention includes: an image reading section for obtaining image data of a document image by reading a document; and any one of the image processing apparatuses as described above. Further, an image transmitting device of the present invention includes: any one of the image processing apparatuses as described above; and a communication section for transmitting the image file generated by the image file generation section, to an external device communicably connected. Furthermore, an image forming apparatus of the present invention includes: any one of the image processing apparatuses as described above; and an image forming section for forming, on a recording material, an image in accordance with the image data.

According to the configuration, for a character for which a plurality of possible character recognition results are present, a search including these possible character recognition results can be performed in a case where the keyword search is performed by use of the image file generated. This can prevent omission in search.

Note that the image processing apparatus may be realized by a computer. In such a case, the scope of the present invention encompasses an image processing program and a computer-readable storage medium storing the image processing program for realizing the image processing apparatus with use of the computer by causing the computer to operate as the sections described above.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is suitably applied to an image processing apparatus, an image reading apparatus, and an image transmitting device each of which produces an image file in which image data obtained by reading a document is associated with text data obtained by a character recognition process on the image data.

What is claimed:

1. An image processing apparatus comprising:
one or more processing devices;
one or more storage devices storing instructions to be executed by the one or more processing devices,
the instructions being for causing at least one of the one or more processing devices to function as a character recognition section for performing a character recognition process for a character included in a document, based on image data obtained by reading the document,
an image file generation section for generating an image file in which text data obtained by the character recognition process are associated with the image data, and
a layout analysis section for analyzing layout, based on the image data, whether a word or a sentence described in the document is in vertical writing or horizontal writing,
the character recognition section (i) performing a word recognition process of the word included in the document, by matching a combination of adjacent characters and word data in dictionary data, based on the character recognition result for each character included in the image data and an analysis result of the layout analysis process and (ii) producing the text data corresponding respectively to a word detected in the recognition process of the word on an assumption of vertical writing and a word detected in the recognition process of the word on an assumption of horizontal writing, in a case where it is indeterminable by the layout analysis section whether the word or the sentence described in the document is in the vertical writing or the horizontal writing,
the image file generation section generating the image file in which each of the text data produced by the character recognition section is associated with the image data.

2. The image processing apparatus as set forth in claim 1, wherein:
the character recognition section generates the text data corresponding respectively to a plurality of characters, in a case where the plurality of characters are detected as the plurality of possible character recognition results with respect to one character; and
the image file generation section generates the image file in which each of the text data produced by the character recognition section is associated with the image data.

3. The image processing apparatus as set forth in claim 1, wherein:
the image file generation section associates, in the image file, the text data with a position of the character on the document, the character corresponding to the text data in the image data.

4. The image processing apparatus as set forth in claim 3, wherein:
the image file generation section sets the text data as transparent text data in a position corresponding to the position of the character on the document, the character corresponding to the text data in the image data.

5. An image forming apparatus comprising:
an image processing apparatus as set forth in claim 1; and
an image forming section for forming, on a recording material, an image in accordance with the image data.

6. A non-transitory computer-readable storage medium storing a program for operating an image processing apparatus as set forth in claim 1, the program for causing a computer to operate as each of the character recognition section and the image file generation section.

7. An image processing method comprising:
performing a character recognition process for a character included in a document, based on image data obtained by reading the document;
generating an image file in which text data obtained by the character recognition process are associated with the image data; and
analyzing layout, based on the image data, whether a word or sentence described in the document is in vertical writing or horizontal writing, wherein:
in the step of performing the character recognition process, (i) a word recognition process of the word included in the document is performed by matching a combination of adjacent characters and word data in dictionary data, based on the character recognition result for each character included in the image data and an analysis result in the step of analyzing layout and (ii) the text data corresponding respectively to a word detected in the recognition process of the word on an assumption of vertical writing and a word detected in the recognition process of the word on an assumption of horizontal writing is produced in a case where it is indeterminable in the step of analyzing layout whether the word or the sentence described in the document is in the vertical writing or the horizontal writing; and
in the step of generating the image file, the image file in which each of the text data produced in the step of performing the character recognition process is associated with the image data is generated.

* * * * *